(12) United States Patent
Roberts et al.

(10) Patent No.: US 12,189,824 B2
(45) Date of Patent: Jan. 7, 2025

(54) REGISTER FILE PROTECTION

(71) Applicant: Google LLC, Mountain View, CA (US)

(72) Inventors: Thomas Edward Roberts, Cambridge (GB); Timothy Jay Chen, Pleasanton, CA (US)

(73) Assignee: Google LLC, Mountain View, CA (US)

( * ) Notice: Subject to any disclaimer, the term of this patent is extended or adjusted under 35 U.S.C. 154(b) by 333 days.

(21) Appl. No.: 17/338,329

(22) Filed: Jun. 3, 2021

(65) Prior Publication Data

US 2022/0391540 A1    Dec. 8, 2022

(51) Int. Cl.
*G06F 21/64*      (2013.01)
*G06F 7/544*      (2006.01)
*G06F 9/30*       (2018.01)

(52) U.S. Cl.
CPC ............ *G06F 21/64* (2013.01); *G06F 7/5443* (2013.01); *G06F 9/30109* (2013.01)

(58) Field of Classification Search
CPC ..... G06F 21/64; G06F 7/5443; G06F 9/30109
See application file for complete search history.

(56) References Cited

U.S. PATENT DOCUMENTS

| | | | |
|---|---|---|---|
| 7,412,475 B1 * | 8/2008 | Govindarajalu | .... G06F 11/0721 708/530 |
| 9,152,512 B2 | 10/2015 | Cronin et al. | |
| 9,183,085 B1 | 11/2015 | Northcott | |
| 10,691,534 B2 | 6/2020 | Hsiao et al. | |
| 10,908,987 B1 | 2/2021 | Pandey et al. | |
| 2005/0076266 A1 * | 4/2005 | Costin | ................... G06F 11/167 714/E11.132 |

(Continued)

FOREIGN PATENT DOCUMENTS

CN    111666246    9/2020
CN    111859472    10/2020

(Continued)

OTHER PUBLICATIONS

"International Search Report and Written Opinion", Application No. PCT/US2022/071604, Jul. 21, 2022, 11 pages.

(Continued)

*Primary Examiner* — Matthew T Henning
(74) *Attorney, Agent, or Firm* — Colby Nipper PLLC

(57) ABSTRACT

An integrated circuit chip can provide protection with registers of a register file. A processor can be part of general or security-oriented (e.g., root-of-trust (RoT)) circuitry. In described implementations, the processor includes multiple register blocks for storing multiple register values. The processor also includes multiple integrity blocks for storing multiple integrity codes. A respective integrity block is associated with a respective register block. The respective integrity block can store a respective integrity code that is derived from a respective register value that is stored in the respective register block. The integrity code can enable detection or correction of one or more corrupted bits in the register value. An integrity controller of the processor can monitor the register value regularly or in response to an access by an execution unit. The controller can take a protective action if corruption is detected. This enables information protection to extend to processor execution units.

20 Claims, 9 Drawing Sheets

(56) References Cited

U.S. PATENT DOCUMENTS

| | | |
|---|---|---|
| 2017/0177259 A1 | 6/2017 | Motwani |
| 2019/0155754 A1 | 5/2019 | Kida et al. |
| 2020/0021308 A1* | 1/2020 | Meier ................... H03M 13/09 |
| 2020/0278937 A1 | 9/2020 | Durham et al. |
| 2021/0049309 A1 | 2/2021 | Su |
| 2021/0050941 A1 | 2/2021 | Das et al. |
| 2021/0089388 A1 | 3/2021 | Makaram et al. |
| 2021/0099469 A1 | 4/2021 | Zeh et al. |
| 2021/0365566 A1* | 11/2021 | Souissi ................. H04L 9/0861 |
| 2024/0169098 A1 | 5/2024 | Chen et al. |

FOREIGN PATENT DOCUMENTS

| | | |
|---|---|---|
| JP | 2003506750 A | 2/2003 |
| JP | 2015216469 A | 12/2015 |
| JP | 2016100725 A | 5/2016 |
| JP | 2019205015 A | 11/2019 |
| WO | 2018034682 A1 | 2/2018 |
| WO | 2022217260 | 10/2022 |

OTHER PUBLICATIONS

"Foreign Office Action", TW Application No. 111113366, Oct. 3, 2022, 11 pages.

"International Preliminary Report on Patentability", Application No. PCT/US2022/071604, Oct. 10, 2023, 8 pages.

"Foreign Office Action", JP Application No. 2023-557177, Oct. 8, 2024, 24 pages.

* cited by examiner

REGISTER FILE PROTECTION

BACKGROUND

Electronic devices play integral roles in manufacturing, communication, transportation, healthcare, commerce, social interaction, and entertainment. For example, electronic devices power the server farms that provide cloud-based or distributed computing functionality for communication and e-commerce. Electronic devices are also embedded in many different types of modern equipment, from medical devices to appliances and from vehicles to industrial tools. Personal electronic devices enable portable video viewing and convenient access to smart digital assistants. Additionally, one versatile electronic device—the smartphone—has practically become a necessity to have within arm's reach. With electronic devices becoming pervasive and crucial to many aspects of modern life, device security has become imperative.

Many people are familiar with malware, which is sometimes referred to generically as a "computer virus." Some malware is designed to gain unauthorized access to information stored in an electronic device or to otherwise compromise the electronic device. Several strategies can help keep a user's devices and information safe from security threats by countering certain types of malware. These strategies include employing and regularly updating a resilient operating system, engaging in safe computing practices, and installing an anti-malware program. Unfortunately, these strategies cannot make an electronic device invulnerable to all malware attacks.

Further, electronic devices can also be vulnerable to other types of attacks besides those carried out by software-based malware. For example, the safe and reliable operation of electronic devices, as well as the security of information stored by such devices, can be jeopardized by physical attacks on hardware and by radio-frequency attacks against wireless communications. In other words, some forms of attack can circumvent or undermine the strategies listed above to enable a bad actor to compromise an electronic device and potentially gain access to accounts that are used with the device.

Electronic devices generally include at least one integrated circuit (IC) that provides the intelligence to enable various functionalities. These functionalities facilitate commerce, streamline healthcare access, provide entertainment, support social-media interactions, and enable other services as identified above. An electronic device may also store or otherwise utilize information that is to be safeguarded. To support these functionalities and facilitate safe operation, some electronic devices include hardware-based protection in the form of security circuitry that is part of an IC. Unfortunately, existing approaches to security circuitry are inadequate to combat the wide variety of software, physical, and electromagnetic attacks that are unleashed on electronic devices today.

SUMMARY

Certain electronic devices, like server computers and smartphones, are responsible for providing services to users. Users rely on these electronic devices to obtain critical services that may be accessed using one or more accounts, like those for financial services or air travel. Because of the linkages between electronic devices and accounts, a compromised electronic device may permit undesired access to the services associated with an account or may permit unauthorized access to the account itself. Further, to provide services that are associated with accounts, such electronic devices may store account-related information that is to be safeguarded, such as financial data, usernames, passwords, and secret keys for encryption. Unfortunately, anti-malware programs cannot block all avenues of attack against an electronic device. An anti-malware program may not, for instance, provide protection against a direct physical attack that uses miniature probes to detect voltage levels on an integrated circuit (IC) chip. Consequently, it is beneficial to incorporate into an electronic device hardware-based measures that can identify, block, repel, or otherwise thwart attacks on the electronic device, including counteracting physical attacks.

An electronic device can include security circuitry to counter attacks from bad actors that would access accounts, steal files, or otherwise harm an owner of the electronic device. In some cases, the security circuitry detects inappropriate or suspicious activity and takes protective action. The security circuitry can be implemented in different manners. For example, computer engineers can fabricate security circuitry as a standalone IC chip or as part of another chip, such as a system-on-a-chip (SoC). The security circuitry can be part of a protected enclave, a trusted chip platform or computing base, a hardware-based root of trust (RoT) (e.g., silicon RoT), or a combination thereof. Regardless of how or where the security circuitry is incorporated into an electronic device, computer engineers may design security circuitry to counter many different types of attacks, some of which are described next.

Attacks on electronic devices can take the form of programs that observe screen images or monitor user input to obtain information, applications that attempt to read data from protected areas of memory, physical glitching to inject faults, direct physical probing of circuitry to observe voltages, and so forth. Different instances of security circuitry may perform multiple functions to combat one or more of these attacks. For example, security circuitry can protect an encryption key during its use, while it is in transit between different components, or while it is in storage. To do so, dedicated memory and private data buses can be employed. Security circuitry can also generate high-quality pseudorandom numbers or operate a cryptographic engine in an area that is separate from applications that may operate as malware. Further, security circuitry may ensure that hardware is booted using the correct and untampered basic input/output system (BIOS) boot code.

Security circuitry can, therefore, be responsible for implementing a diverse suite of functions to combat a wide variety of attacks on electronic devices. Some approaches to security circuitry, however, employ hardware architectures that are designed on a disjointed or ad hoc basis. Different circuit portions of the security circuitry may also be designed in relative isolation from one another. Consequently, circuit portions that are designed to combat various security threats may fail to interoperate as intended, leaving hardware less secure. Poor or exposed inter-component communication can additionally create another avenue of attack for would-be bad actors. Further, this ad hoc approach renders the design and testing phases of security circuitry lengthier, more arduous, and more costly. This can lead to some security threats being ignored or inadequately addressed when the security architecture is developed. These disjointed or ad hoc architectures thus make protecting electronic devices from diverse and varied security threats more difficult.

In contrast, this document describes approaches that provide an adaptable and flexible framework or platform that can produce resilient and programmable security hardware to combat various forms of attacks on electronic devices. Each circuit portion can be enhanced to combat local security threats while also facilitating multi-component cooperation. Different types of circuits, or circuit portions that provide different security-related functionality, can communicate using an expansive protocol that nonetheless produces predictable and consistent signaling. The communication protocol enables circuits that provide different security-related functions to interact seamlessly in accordance with a specified design framework. As used herein, "comportable components" can include those components that are designed to adhere to a common framework such that the components are suitable for use together. In some cases, comportability provides a degree of plug-and-play capability, including with inter-component communications, between two or more security-related components of an IC chip.

Generally, computing devices are subject to attacks that can corrupt or steal data that is stored by an IC or that is in transit between components of an IC. A hardware root of trust (RoT) scheme can combat many attacks, including some physical ones. Thus, RoT silicon can include integrated circuitry that provides security features. Security circuitry can include at least one processor for logical or mathematical operations and an interconnect for communication between two or more components. Security circuitry can also include multiple peripheral devices that are coupled to each other or to the processor via the interconnect. In some implementations, the interconnect can include a first portion for propagating information (e.g., data, addresses, or instructions) and a second portion for propagating an integrity code that corresponds to, and may be based on, the information. As described herein, the integrity code (e.g., an error checking code) can enable at least detection, and potentially correction, of errors that occur in the associated information. Incorporating an integrity code into the exchange of information between two or more components of an IC chip can thwart some physical attacks against the interconnect or against an interface that couples a component to the interconnect.

In other implementations, information can be protected while located or situated at a processor using an integrity code. A processor can be realized with a core processor, a central processing unit, a cryptographic processor or accelerator, and so forth. Generally, a processor includes a register file with one or more registers, which may be referred to as processor registers. A register stores "working" data or other information for the processor. The working data can include, for example, operands or results of processor operations. The register file can operate like a scratchpad for an execution unit of the processor. Accordingly, the register file may be coupled to an arithmetic unit, a multiply-accumulate unit, a logic unit, and so forth. The security circuitry can use the integrity code to ensure that the associated information in a register is accurate or uncorrupted.

Information in a register can become incorrect due to manufacturing defects, electromagnetic radiation, a physical attack, and so forth. The security circuitry can use a stored integrity code to verify that corresponding information is correct by comparing the stored integrity code, which was determined previously, to a computed integrity code that is based on the current information in the register. The security circuitry can check the information randomly, at preset intervals, or in response to a storage or retrieval operation for the register holding the information. If the information is verified, the information can be used without incident. If, on the other hand, the information is not verified as being correct, the information may be correctable depending on the extent of the changes to the information or on the type of integrity code being employed. Alternatively, the security circuitry can take another protective action, such as by voiding an operation that used the corrupt information or by resetting at least a portion of the IC chip.

In these manners, security circuitry can be incorporated into a silicon RoT chip, an SoC, or other integrated circuitry to protect information and digital operations that use processor registers. The security circuitry can extend integrity protection farther between an origin for information and a destination for information, including by providing end-to-end protection with an integrity code. To do so, a processor that is to perform operations using information may verify that the information is uncorrupted "shortly" before using the information in an execution unit or otherwise before relying on the information. For example, the security circuitry can have at least one processor that includes one or more processor registers in a register file with multiple register blocks. Each register block can store a register value. The register file can also include, or may be associated with, multiple integrity blocks. Each integrity block can store an integrity code. The register value in each respective register block corresponds to a respective integrity code in the corresponding integrity block. An integrity controller can compute the respective integrity code based on the respective register value using an algorithm (e.g., one for a Hamming code, such as a Hsiao code).

The security circuitry can therefore verify the accuracy of the information that is held as a register value in physical and/or temporal proximity to its usage in an arithmetic logic unit (ALU) or other execution unit of the processor. The processor can also include an interface for coupling to an interconnect that involves using the integrity code to extend integrity protection. The interface may include a first portion for buffering the register value and a second portion for buffering the corresponding integrity code. The security circuitry can also or instead include an interconnect having a first portion that propagates the register value and a second portion that propagates the corresponding integrity code to or from another component. Thus, by employing a transmission medium that carries the integrity code, the security circuitry can detect an error in information that occurs while the information is in transit between, for instance, a place of origin or storage for the information and a place of use.

Aspects described below include an integrated circuit for register file protection. The integrated circuit includes a processor, and the processor includes multiple register blocks and multiple integrity blocks. The multiple register blocks are configured to store multiple register values. The multiple integrity blocks are configured to store multiple integrity codes. A respective integrity block of the multiple integrity blocks is associated with a respective register block of the multiple register blocks. The respective integrity block is configured to store a respective integrity code that is derived from a respective register value stored in the respective register block.

Aspects described below include a method for register file protection that can be performed by at least part of an integrated circuit, such as a processor. The method includes retrieving a register value from a register block of the processor. The method also includes retrieving an integrity code from an integrity block of the processor, with the integrity block associated with the register block. The method additionally includes obtaining a computed integrity code based on the register value and comparing the computed integrity code and the integrity code. The method further includes selectively implementing a protective measure based on the comparing.

Aspects described below include an integrated circuit for register file protection. The integrated circuit includes an execution unit, a cache memory, and a register file. The register file is coupled between the execution unit and the cache memory. The register file has a register entry including a register block and an integrity block. The register block is configured to store a register value. The integrity block is associated with the register block, and the integrity block is configured to store an integrity code that is derived from the register value.

BRIEF DESCRIPTION OF THE DRAWINGS

Apparatuses of and techniques for register file protection are described with reference to the following drawings. The same numbers are used throughout the drawings to reference like features and components.

DETAILED DESCRIPTION

Overview

Figure 1:
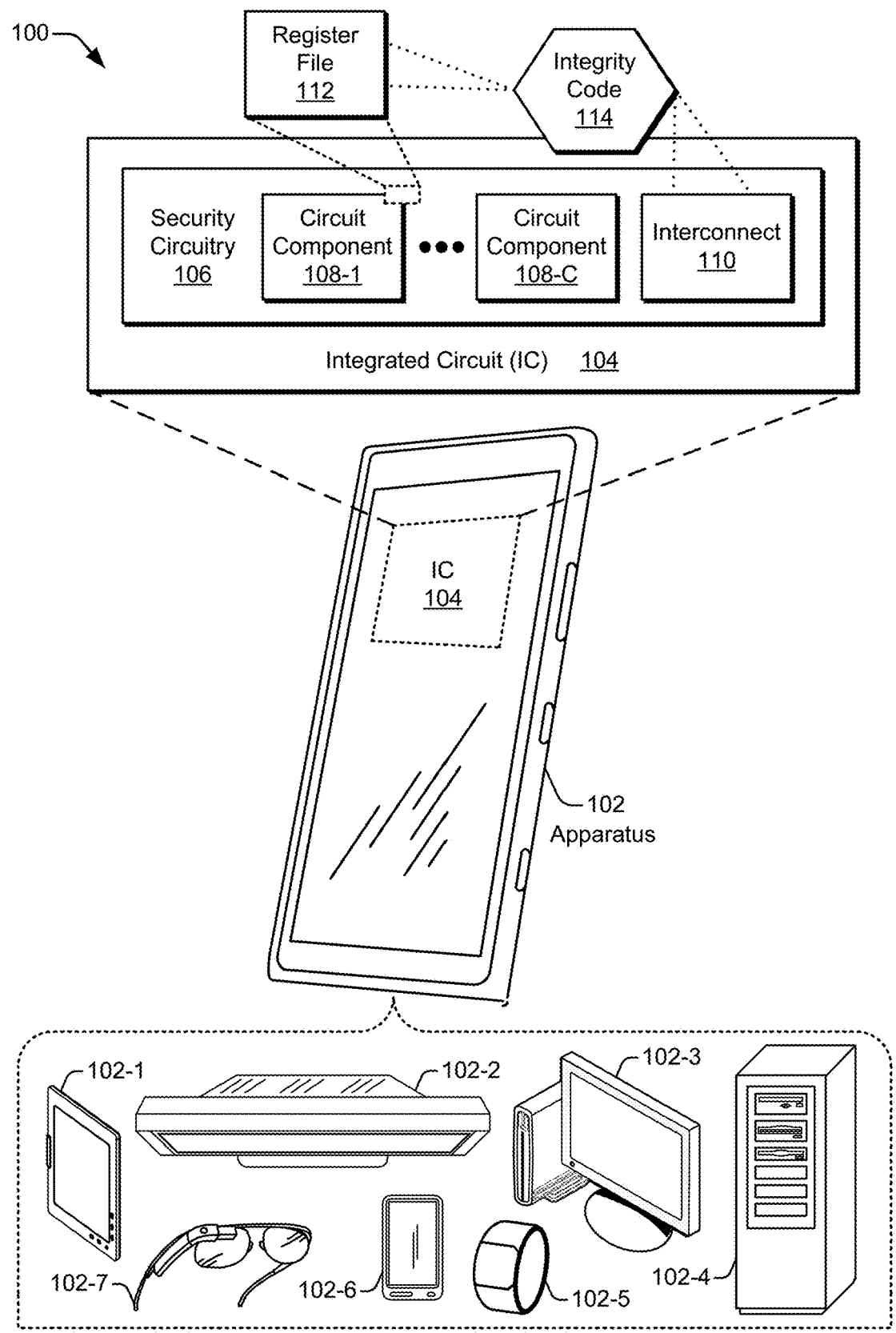
FIG. 1 illustrates an example apparatus with an integrated circuit (IC) that includes security circuitry in which register file protection can be implemented.

Electronic devices make crucial contributions to modern society, such as those for communication, safety, and manufacturing. Each electronic device relies on an integrated circuit (IC) that has processing capabilities to provide some functionality. With the critical nature of so many of these functionalities, an electronic device may include an IC with security circuitry to provide a measure of protection against defects, attacks, and other potentially compromising events. The security circuitry reduces the opportunity for information to be inadvertently exposed or for some function to be used in a harmful or otherwise unauthorized manner. Security circuitry can be realized in a multitude of forms, one of which involves the root of trust (RoT) paradigm.

With RoT silicon, a hardware-based mechanism keeps computing safe by limiting inappropriate access to information, deterring unauthorized use of a device, and so forth. Silicon RoT circuitry and techniques can help ensure that hardware infrastructure and the software that executes thereon both remain in their intended, trustworthy state. To do so, the RoT silicon can verify that critical system components boot securely using authorized and verifiable code. Thus, RoT circuitry can ensure that a server or another electronic device boots with the correct firmware and that the firmware has not been infected by low-level malware. RoT silicon can provide additional or alternative security benefits. For example, it can provide a cryptographically unique machine identity; this unique identity enables an operator to verify that an electronic device is legitimate. Further, RoT hardware can maintain encryption keys and other information in a tamper-resistant silo, which can prevent even those with physical access to a device from obtaining the information. RoT services that are anchored in hardware can also offer authoritative, tamper-evident audit records and other runtime security services.

Chip designers can incorporate silicon RoT technology into individual IC chips that focus on providing security functions. Alternatively, RoT silicon can be integrated in a chip with other circuitry, including in a central processing unit (CPU) chip or package, in a graphics processing unit (GPU) chip or card, in a system-on-a-chip (SoC), in a memory storage module, and so forth. Generally, security circuitry can operate in server motherboards, network cards, client devices (e.g., laptops and smartphones), consumer routers, internet-of-things (IoT) devices, and fixed and portable storage units, just to name a few examples. By anchoring the RoT in silicon, computing security is enhanced across hardware, firmware, and software levels regardless of application or electronic device. RoT silicon can also enhance security across different devices that are in communication with each other directly or via a network. Although some security and circuit design principles are described in this document using a silicon or hardware RoT environment, this description is provided by way of example only, for the described principles are applicable to security circuitry generally.

In today's computing environment, bad actors can attack electronic devices at a myriad of levels using a multitude of attack vectors. For example, an attack can be made using malware that is transmitted over the internet to attempt to obtain information that is stored in a laptop but that a user wishes to be safeguarded. Alternatively, an attack may involve injecting malware into firmware that is used to boot an electronic device, like a Wi-Fi® router or an IoT device, during transportation of the device or while the device operates in an unobserved location. As another example, a bad actor may steal an electronic device and have ample time to perpetrate direct physical attacks on the device. Such direct physical attacks can include severing wires, injecting electrical or electromagnetic disturbances, probing voltages, repeatedly running code to observe trends and thereby infer information, and so forth.

To attempt to counter such a wide array of potential attacks on electronic devices, security circuitry may be responsible for implementing a diverse suite of functions. Some approaches to security circuitry, however, employ hardware architectures that are designed on a disjointed or an ad hoc basis. Different circuit portions of the security circuitry may also be designed in relative isolation from one other. Consequently, circuit portions that are designed to combat various security threats may fail to interoperate as intended, leaving hardware less secure. Additionally, undefended or exposed intercomponent communications can create another avenue of attack for would-be bad actors. Further, the disjointed, or ad hoc, approach makes the design and testing phases of security circuitry development more arduous, lengthier, and costlier. This can lead to some security threats being ignored or inadequately addressed when the security architecture is developed. These disjointed and ad hoc architectures, therefore, make protecting electronic devices from diverse and varied security threats more difficult.

In contrast, this document describes example approaches that provide an adaptable and flexible framework or platform that can produce resilient and programmable security hardware to combat various forms of attacks on electronic devices. Security circuitry, including different types of circuits or circuit portions that provide different security-related functionality, can communicate using an expansive protocol that nonetheless produces predictable and consistent signaling. Such a communication protocol enables various circuits, which provide different security-related functions, to interact seamlessly in accordance with a specified design framework.

In some cases, the design framework or communication protocol produces comportable components such that even circuit components that are designed separately from one another are suitable to be consistently deployed together with stable, predictable interactions. For example, communications and other forms of interactions (e.g., the sharing of resources such as buses, interfaces, or memory) can be at least partially standardized to provide a measure of predictability and interoperability. As used herein, "comportable components" can include those components that are designed to adhere to a common framework such that the components are suitable for use together. Comportability can provide, for instance, a degree of plug-and-play capability between two or more security-related components of an IC chip.

In some implementations, security circuitry includes a processor with a register file. The security circuitry can also include an interconnect and one or more peripheral devices that are coupled to each other or the processor via the interconnect. Each peripheral device of multiple peripheral devices can perform a respective function that contributes to the safety or proper functioning of the security circuitry. Thus, each peripheral device can provide a core or primary security-related function or can provide a contributing or secondary security-related function. Each security-related function, like controlling access to data or performing encryption operations, can support an overall purpose of the security circuitry. The purpose of the security circuitry can include providing one or more features to enable secure computing by other circuitry and/or ICs of an electronic device. For the sake of completeness, predictability, or interoperability, each peripheral device may be realized as a comportable component in some security circuitry architectures.

An example of a circuit component that can be implemented as a comportable component is a processor, such as a main processor or a cryptographic processor, which may include a cryptographic coprocessor or accelerator. In some architectures, a main or central processor can provide general computing functions including executing user software. A cryptographic processor can be coupled to a system bus or other interconnect and provide cryptographic functions, such as performing mathematical computations, for security circuitry or another part of an integrated circuit. A processor may be implemented as a peripheral device or as a separate component of security circuitry or of circuitry generally.

In example implementations, a processor includes a register file having at least one register. The registers, or processor registers, store "working" data for a processor. The registers may be tightly coupled to an arithmetic logic unit (ALU) or other execution unit to enable the processor to quickly access the working data. In effect, the register file functions like a scratchpad for the execution unit. To further facilitate access to the data, the register file may include multiple read ports or multiple write ports to enable an execution unit to contemporaneously retrieve multiple operands in a single cycle. The processor, or execution unit thereof, may access the register file using a register address space that is separate from the system address space. In some cases, registers are numbered for access via a register address space. Additionally, register files may be formed from flip-flops to accelerate reading and writing bits of the data.

Some approaches to security circuitry omit consideration or protection of information that is present in the register file of a processor. Potential causes of corruption for the information stored in processor registers include physical defects from manufacturing, randomly occurring electromagnetic phenomena, and attacks from bad actors. This last cause is more likely to impact a register file of a security processor in which the registers are implemented with flip-flops than the first two causes. Thus, the greatest risk to information stored in a register file may be those errors that are intentionally introduced by an attacker manipulating the environment of an IC chip to subvert a security feature of the electronic device. Any errors that occur or accumulate in the register file affect the subsequent execution of instructions by the processing unit. These errors cause executing software to deviate from the course originally intended by the programmer. To counter these potential avenues of information corruption, protective codes can be added to, or associated with, the register file as is described below. Security circuitry can use the protective codes to ensure that information stored in the processor registers is not changed without being detectable by the processor.

To enhance protection of the stored register information, a register block includes or is otherwise associated with an integrity block. The register block can store information serving as, for example, an operand or a result of one or more arithmetic operations. The integrity block can store an integrity code that is determined based on the associated information, or register value, of the register block. For instance, integrity control circuitry can compute an error check code type of integrity code based on the information held by the processor register. To verify the ongoing integrity of the information of the register, the integrity control circuitry can compare an integrity code that is computed relatively recently with the integrity code stored in the integrity block, which stored integrity code was determined earlier. The integrity control circuitry can perform some protective action based on the comparison, such as based on whether the two integrity codes match.

If the two integrity codes match, the integrity control circuitry can take no action, permit an operation to proceed (e.g., by taking no action or by providing an affirmative authorization signal), and so forth. On the other hand, if the two integrity codes do not match, the integrity control circuitry can take a protective action due to the register information being corrupted or otherwise incorrect. For example, the integrity control circuitry can attempt to correct the data based on the earlier-determined integrity code if such a code provides an error correction feature. Additionally or alternatively, the integrity control circuitry can block or otherwise stop an operation from being performed using the incorrect information. The integrity control circuitry may also rollback an operation or mark a result of an operation as being unusable if the integrity codes fail to match.

The integrity control circuitry can perform a check of the information stored in a register of the processor at different times or in response to different events. For example, the integrity control circuitry can verify that information is uncorrupted using an associated integrity code at random times. The integrity control circuitry can also verify information repeatedly, such as at regular intervals. Further, information may be checked in response to the register value being loaded into a register file, in response to the register value being accessed (e.g., retrieved or read) for an operation, and so forth. The integrity control circuitry can also compute an "initial" integrity code for a newly produced result of an operation and store the integrity code in association with the operation result in a processor register.

For information that arrives from another component, the integrity control circuitry can compute an initial integrity code if one is not received with the information. Alternatively, the processor may receive an integrity code from another component in conjunction with receiving associated information in environments that offer extended protection for information while in transit. For example, a system may include an interconnect that propagates information and associated integrity codes to foster protection for information while such information is being transported between two or more circuit components. Thus, the interconnect may be sufficiently wide to propagate in parallel bits spanning the information and the integrity code. To transmit and receive the information and associated integrity code, the transmitting component and the receiving component may each include an interface that can buffer the information in association with the integrity code.

Accordingly, a data memory integrity protection scheme that avoids recalculating integrity bits across two or more components can be implemented. For example, security circuitry can include an end-to-end integrity-protected path from shared memory to the register file of the processor. An integrity protection scheme that can consume the integrity-protected information (e.g., the information plus protection bits) can be incorporated into the processor. The integrity protection scheme can extend, for instance, from system memory, through the system bus, and into the processor's register file without reencoding the protection bits. In such implementations, an associated integrity code can be determined near a source of the information, and the information can be propagated with the associated integrity code. A destination or consumer of the information can then check that the information is unchanged near in time and/or distance to the use of the information.

In these manners, the information held in a register file of a processor can be protected using an integrity code. Corruption of the information can be detected proximate to where the information is used by an execution unit of the processor. If the information cannot be verified, the integrity control circuitry can prevent the corrupted information from being used. Further, in some implementations, an interconnect can propagate information with associated integrity codes. The components exchanging such information may include respective interfaces to buffer the information and the associated integrity codes. These techniques can extend the range of protection for the information beyond being confined within a single component. The processor register file protection implementations can be used together with, or separately from, the interconnect and interface protection implementations.

This document describes protection for information held in a register file of a processor using an integrity code. This document also describes how an interconnect can carry the information and the integrity code between two or more components. At information-exchanging components, interfaces that can jointly buffer the information and associated integrity code are also described. First, however, security environment examples are described with reference to FIGS. 1 and 2. Further, examples of peripheral device interfaces and an interconnect are described thereafter with reference to FIG. 3.

Example implementations in various levels of detail are discussed below with reference to the associated figures. The discussion below first sets forth an example operating environment and then describes example hardware, schemes, and techniques. Example methods are described thereafter with reference to flow charts or diagrams. Finally, an example computing device is described.

Example Operating Environment for Register File Protection

FIG. 1 illustrates, at 100 generally, an example apparatus 102 with an integrated circuit 104 (IC 104) that includes security circuitry 106. The apparatus 102, the integrated circuit 104, and/or the security circuitry 106 can implement register file protection as described herein. In this example, the apparatus 102 is depicted as a smartphone. The apparatus 102 may, however, be implemented as any suitable computing or electronic device.

Examples of the apparatus 102 include a mobile electronic device, mobile communication device, modem, cellular or mobile phone, mobile station, gaming device, navigation device, media or entertainment device (e.g., a media streamer or gaming controller), laptop computer, desktop computer, tablet computer, smart appliance, vehicle-based electronic system, wearable computing device (e.g., clothing, watch, or reality-altering glasses), Internet of Things (IoTs) device, sensor, stock management device, electronic portion of a machine or piece of equipment (e.g., vehicle or robot), memory storage device (e.g., a solid-state drive (SSD)), server computer or portion thereof (e.g., a server blade or rack or another part of a datacenter), and the like. Illustrated examples of the apparatus 102 include a tablet device 102-1, a smart television (or monitor) 102-2, a desktop computer 102-3, a server computer 102-4, a smartwatch 102-5, a smartphone (or document reader) 102-6, and intelligent glasses (or another wearable) 102-7.

In example implementations, the apparatus 102 includes at least one integrated circuit 104. The integrated circuit 104 can be mounted on a module, card, or printed circuit board (PCB) (not shown). Examples of a PCB include a flexible PCB, a rigid PCB, a single or multi-layered PCB, a surface-mounted or through-hole PCB, combinations thereof, and so forth. Each integrated circuit 104 can be realized as or using a general-purpose processor, a system-on-a-chip (SoC), a security-oriented IC (e.g., a root-of-trust (RoT) chip), a memory chip, a communications IC (e.g., a modem or radio-frequency IC), a graphics processor, an artificial intelligence (AI) accelerator, a portion or combinations thereof, and so forth. The integrated circuit 104 can be packaged alone or together with other IC chips.

Figure 2:
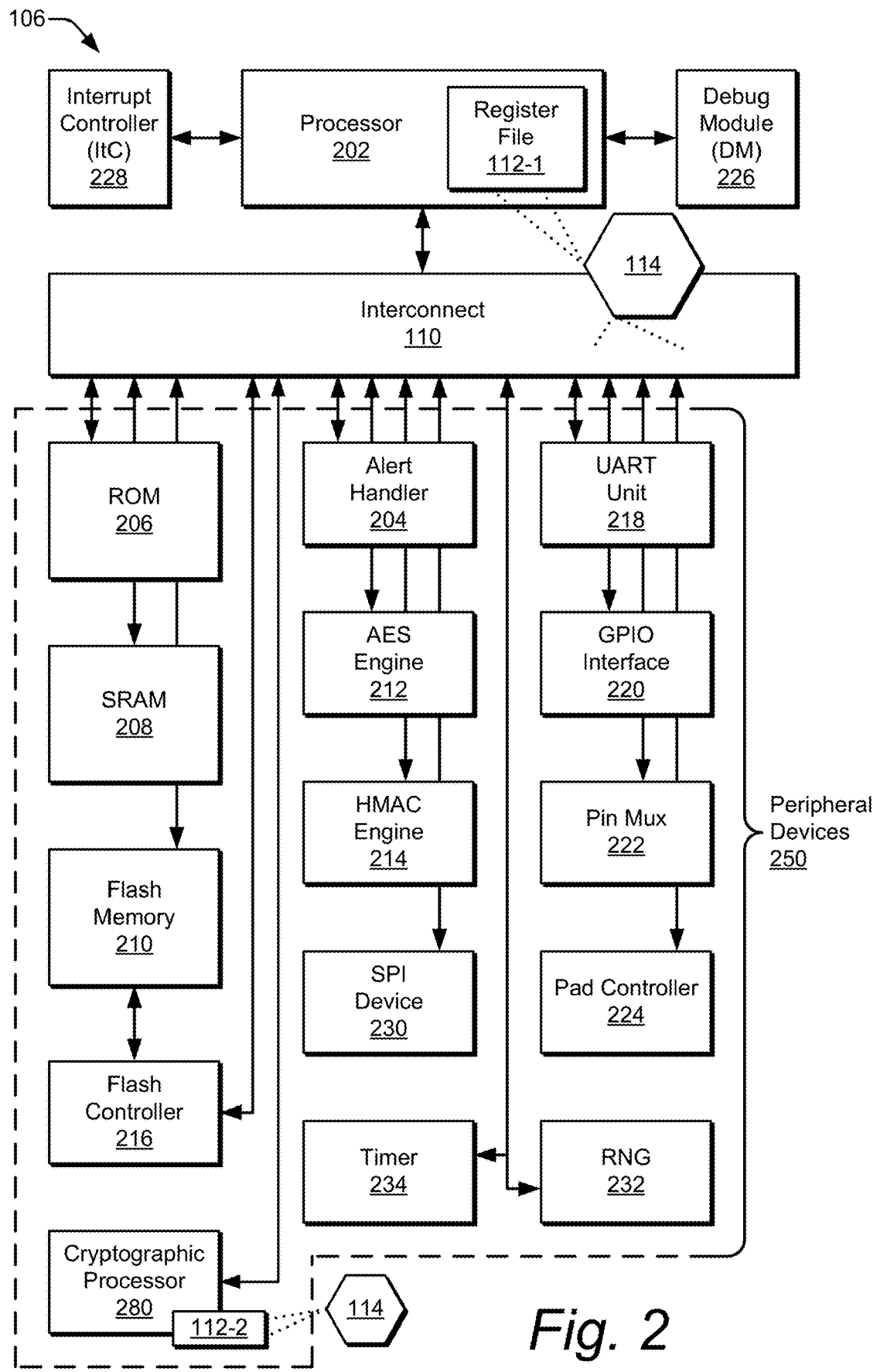
FIG. 2 illustrates example security circuitry that includes multiple circuit components, such as one or more processors that can include a register file associated with at least one integrity code.

As shown, the integrated circuit 104 includes security circuitry 106. The security circuitry 106 can include a variety of parts, including multiple circuit components 108-1 . . . 108-C, where C represents a positive integer, and an interconnect 110. In addition to the separately depicted interconnect 110, examples of a circuit component 108 include a processor and multiple peripheral devices. Examples of these are depicted in FIG. 2 and described below. Although not explicitly shown in FIG. 1, the integrated circuit 104 may include other portions besides the security circuitry 106. While the multiple circuit components 108-1 . . . 108-C and the interconnect 110 may be integrated together on a single IC as shown, the components may alternatively be distributed across two or more ICs. The security circuitry 106 can be realized with, for example, a protected enclave, a trusted chip platform, a hardware-based root of trust (RoT) chip (e.g., RoT silicon), and so forth. Regardless of how or where the security circuitry 106 is incorporated into an electronic device, the security circuitry 106 may counter many different types of attacks.

In example operations, once an attack—or a potential attack—or an anomalous occurrence is detected, an alert or an interrupt can be generated by some component. Additionally or alternatively, a component may take direct action to counter the detected event. For example, a processor instance of a circuit component 108 can generate an alert in response to detection of incorrect information in a register file 112. Thus, a processor, which is described below, can include at least one register file 112. The register file 112 can include or otherwise be associated with at least one integrity code 114. For example, each entry of the register file 112 may include a register value and a corresponding integrity code 114 that is derived from, or otherwise based on, the register value. As indicated in FIG. 1, the interconnect 110 can also or instead include at least one integrity code 114.

Although some aspects of register file protection are presented in terms of security circuitry, protecting the contents of processor registers and/or using integrity codes can be implemented with other types of circuitry. This document describes with reference to FIG. 4 et seq. example approaches to register file protection and other utilizations of integrity codes, such as with an interconnect. With reference to FIG. 2, however, example architectures of the security circuitry 106 are described next.

FIG. 2 illustrates example security circuitry 106 that includes multiple circuit components, such as one or more processors that can include a register file 112 associated with at least one integrity code 114. The multiple circuit components can also include any one or more of multiple example peripheral devices 250. As shown, the security circuitry 106 includes a processor 202 that is coupled to the interconnect 110. The interconnect 110 can be realized using, for example, a bus, a switching fabric, or a bus network that enables the various circuit components to communicate. The multiple circuit components 108-1 . . . 108-C (of FIG. 1) can include, besides the interconnect 110 and the processor 202, one or more memories, one or more peripheral devices, and so forth. Each of the processor 202, the multiple memories, and the multiple other peripheral devices 250 can be directly or indirectly coupled to the interconnect 110.

In example implementations, the multiple memories can include a read-only memory 206 (ROM 206), a static random-access memory 208 (SRAM 208), and a flash memory 210. The multiple peripheral devices 250 can include an alert handler 204, an advanced encryption standard (AES) engine 212 (AES engine 212), a hash-based message authentication code (HMAC) engine 214 (HMAC engine 214), a serial peripheral interface (SPI) device 230 (SPI device 230), and a flash controller 216. The multiple peripheral devices 250 can also include a universal asynchronous receiver/transmitter (UART) unit 218 (UART unit 218), a general-purpose input/output (GPIO) interface 220 (GPIO interface 220), a pin multiplexer 222 (pin mux 222), and a pad controller 224. The multiple peripheral devices 250 can further include a random number generator 232 (RNG 232), a timer 234, and a cryptographic processor 280. Additionally, the peripheral devices 250 can include any of the memories, as shown in FIG. 2. Although certain examples of memories and other peripheral devices 250 are depicted in FIG. 2 or described herein, a given implementation of the security circuitry 106 may include more, fewer, and/or different instances of processors, controllers, memories, modules, or peripheral devices, including none or duplicates thereof.

The illustrated circuit components can be operated synchronously based on one or more clock signals. Although not shown in FIG. 2, the security circuitry 106 may include at least one clock generator to generate the clock signals or may include reset circuitry to reset one or more individual components independently of each other, multiple components jointly, or an entire IC chip. Alternatively, the security circuitry 106 may receive at least one clock signal or a reset signal from a source that is external to the security circuitry 106, which source may or may not be on a separate chip. One or more separate peripheral devices 250 may operate in respective individual clock domains. For instance, input/output (I/O) peripheral devices may be synchronized to a clock that is local to a respective I/O device or channel. Peripheral devices in different clock domains may operate or communicate asynchronously with respect to one another.

Example implementations of the illustrated components are described below. The processor 202 may be realized as a "main," "central," or "core" processor for the security circuitry 106. The processor 202 may, by way of example only, be implemented with a 32-bit, in-order reduced instruction set computing (RISC) core with a multi-stage pipeline. With, e.g., a RISC-V functionality, the processor may implement an M (machine) and a U (user) mode. Activating a reset pin (not shown) (e.g., through de-assertion of an active-low reset pin) can cause the processor 202 to exit reset and begin executing code at its reset vector. The reset vector may begin in the ROM 206, which validates code in the emulated embedded flash (e-flash) before jumping to it. In other words, the code is expected to have been instantiated into the e-flash before the reset is released. In some cases, resets throughout the security circuitry 106 can be made asynchronous active low as per a comportability specification to support interoperability among the various circuit components. A reset may be generated by the alert handler 204 as a security countermeasure, by a watchdog timer, by integrity code control circuitry (which is described below), and so forth. Reset signals may also be sent to other circuit components, such as one of the memories or one of the other peripheral devices 250.

Coupled to the processor 202 are a debug module 226 (DM 226) and an interrupt controller 228 (ItC 228), either of which may also be made comportable. The debug module 226 provides debug access to the processor 202. By interfacing with certain pins of the IC, logic in the debug module 226 allows the processor 202 to enter a debug mode and provides an ability to inject code into the device (e.g., by emulating an instruction) or into a memory. The interrupt controller 228 may be disposed proximate to the processor 202. The interrupt controller 228 can accept a vector of interrupt sources from within the security circuitry 106. The interrupt controller 228 can also assign leveling and priority to the interrupts before forwarding them to the processor 202 for handling.

The processor 202 can provide any desired level of performance or include any internal circuit components. For example, the processor 202 can include at least one arithmetic logic unit (ALU) (or other execution unit) and multiple pipeline stages. With multiple pipeline stages, a pipeline can perform register writeback to reduce a cycle of latency from loads and stores and prevent a pipeline stall where a response to a load or store is available the cycle after the request. The processor 202 can implement a single-cycle multiplier or produce an imprecise exception on an error response to a store, which allows the processor to continue executing past a store without waiting for the response. Although not depicted in FIG. 2, the processor 202 specifically, or the security circuitry 106 generally, can include an instruction cache to provide single-cycle access times for instructions.

In the illustrated example, the security circuitry 106 includes three memory address areas for instructions and data. The ROM 206 can be set as the target for the processor 202 after release of a reset. The ROM 206 contains hard-coded instructions to perform a subset of platform checking before checking the next stage of code. The next stage of code—e.g., a boot loader stored in e-flash memory—can be the first piece of code that is not hard-coded into the silicon of the device. This next stage of code can, therefore, be signature-checked for integrity to increase security. The ROM 206 can execute this signature check by implementing an RSA-check algorithm on the full contents of the boot loader.

The flash memory 210 can be implemented as e-flash memory for code storage. This e-flash can house the boot loader mentioned above, as well as an operating system and applications that layer on top. The SPI device 230 can be used to bulk-load the e-flash memory. The debug module 226 may also be used for code loading. The SRAM 208 can be operated as memory that is available for data storage by the processor 202 (e.g., for stack and heap information). The SRAM 208 can also store code.

The security circuitry 106 can include a suite of "peripherals" or "peripheral devices." These peripheral devices 250 may be subservient components that are coupled to the processor 202 via the interconnect 110. Each of these peripheral devices 250 can follow an interface framework that ensures comportability with each other and with the processor 202. A comportability scheme can specify how the processor 202 communicates with a given peripheral device (e.g., using the interconnect 110); how a peripheral device communicates with the chip I/O (e.g., via a fixed or multiplexable I/O); how a peripheral device communicates with the processor 202 (e.g., using interrupts); how a peripheral device communicates security events (e.g., using alert indications) to other circuit components, like the alert handler 204; how a peripheral device communicates with other peripheral devices (e.g., via at least one register, synchronously, or asynchronously); or combinations thereof. The depicted peripheral devices 250 can comprise peripheral devices relative to the alert-related functionality provided by the alert handler 204, relative to the processor 202 or another processor, relative to one or more of the memories, relative to a chip I/O, and so forth. Thus, the memories can also comprise peripheral devices 250 relative to each other or the other depicted circuit components.

Circuit or chip I/O peripherals include the pin mux 222 and the pad controller 224. The pin mux 222 provides signaling routes between at least a portion of the peripheral devices 250 and available multiplexable I/O nodes of the security circuitry 106 (e.g., pins of the chip in which the various components are integrated or an interface to other portions of an SoC). The pad controller 224 manages control or pad attributes like drive strength, technology, pull up versus pull down, and the like of each of the circuits' (e.g., the chip's) external I/O. The pin mux 222 and the pad controller 224 can be peripheral devices on the interconnect 110. Accordingly, each may have or may otherwise be associated with at least one collection of registers that provide software configurability.

The UART unit 218 can implement UART features, such as single-lane duplex UART functionality. The outputs and inputs thereof can be configured to connect to any circuit I/O via the pin mux 222. The GPIO interface 220 creates G bits of bidirectional communication to external circuitry via the pin mux 222, where G is a positive integer like 16, 32, or 64. Regarding memory I/O, the SPI device 230 can implement a firmware mode. Here, the firmware mode can enable a feature that provides the ability for external drivers to send firmware upgrade code into a bank of the flash memory 210 for in-field firmware updates. The firmware mode can include addressing of the memories using SPI transactions. Although not depicted, the security circuitry 106 can include an inter-integrated circuit (I2C) host to enable command of I2C devices. This command of I2C devices may include standard, full, and fast modes.

Several "core security" peripherals are also depicted, including the encryption engines, the alert handler 204, and the cryptographic processor 280. The AES engine 212 can provide symmetric encryption and decryption using one or more protocols and varying key sizes, like 128b, 192b, or 256b. The component can select encryption or decryption of data that arrives in, e.g., 16-byte quantities to be encrypted or decrypted using different block cipher modes of operation. The AES engine 212 can support electronic codebook (ECB) mode, cipher block chaining (CBC) mode, cipher feedback (CFB) mode, output feedback (OFB) mode, counter (CTR) mode, and the like. Data transfer can be made processor-available, e.g., key and data material may be passed into the cryptographic engine via register writes. Alternatively, private channels for the transfer of key and data material may be included to reduce exposure from potentially untrusted processor activity. The cryptographic processor 280 can efficiently or quickly perform or accelerate cryptographic-related mathematical operations, such as by handling elliptical curves or calculating encryption algorithms.

The HMAC engine 214 may utilize, for instance, a secure hash algorithm (SHA) SHA-256 as a hashing algorithm. SHA-256 is a member of the SHA-2 family of hashing algorithms in which the digest (or hash output) has a 256-bit length, regardless of the data size of the input to be hashed. The data is sent into the HMAC peripheral device after declaring the beginning of a hash request. This zeroes out the internal state to initial conditions, e.g., 32 b at a time. Once the data has been sent by a component client, the client can indicate the completion of the hash request (with optional partial-word final write). In accordance with an example portability interface scheme, the HMAC engine 214 produces the hash result and makes it available for register read by the requesting client. The data transfer may be made processor-available or may be made private to reduce exposure to potentially untrusted processor activity.

HMAC is a message authentication protocol layered on top of a hashing function (e.g., SHA-256), and HMAC mixes in a secret key for cryptographic purposes. HMAC is a particular application of appending the secret key in a prescribed manner, such as twice, around the hashing (e.g., via SHA-256) of the message. To provide this functionality, a 256-bit key may be programmed into the circuit component before the message hash begins. The timing of authentication completion can vary and may be longer in latency than using native SHA-256. The hashing information or the secret key may be made processor-available for convenience or processing efficiency or may be rendered private in some manner for increased security.

The alert handler 204 is responsible for processing and responding to alerts, including ones provided from other peripheral devices 250 or the processor 202. The alerts can be considered security-sensitive interrupts that are to be handled in a timely manner to respond to a perceived security threat. Unlike "standard" interrupts, alerts are not handled solely by software executing on the processor 202. Alerts can trigger a first-stage request to be handled by software as a "regular" interrupt. If, however, the software is not able to respond and properly remedy the alert-triggered interrupt, then the alert handler 204 triggers a second-stage response. The second-stage response can include enacting a security countermeasure, including terminating a process, erasing or otherwise deleting or rendering data unreadable, withdrawing power from a circuit portion, or resetting an IC chip or portion thereof. This ensures that the underlying issue—the perceived security threat—is addressed even if the processor 202 is busy, wedged, or also under attack.

Thus, an alert can be implemented as an elevated interrupt-type signal or alert indication that the alert handler 204 receives from other peripheral devices and that is indicative of a potential security threat. In operation, the alert handler 204 can gather alerts from other circuit components 108 of the security circuitry 106 and convert them into interrupts that the processor 202 can address. If the processor 202 does not clear the interrupt, however, the alert handler 204 can provide hardware responses to address the potential security threat.

For some inter-peripheral-device communications, the alert handler 204 receives differentially signaled synchronous or asynchronous alert indications from peripheral device sources. The peripheral devices 250 can generate alerts based on the functions, knowledge, or sensed parameters of the peripheral devices 250. For other inter-peripheral-device communications, the alert handler 204 performs ping testing of the alert sources as a robust heartbeat mechanism. A ping monitor of the alert handler 204 (not explicitly shown) requests periodic alert responses from each alert source to ensure communication channels with the alert sources are functioning.

The alert handler 204 can also produce locally sourced hardware alerts based on communication failures. A first locally sourced alert is generated if differential signaling or another prescribed communication protocol with an alert source or an escalation handler fails (e.g., if a signal-integrity check fails). The alert handler 204 generates a second such alert if an alert source or an escalation handler fails to respond to a ping request. Generally, the alert handler 204 can receive incoming alerts from throughout the system, classify the alerts, issue interrupts based on the classified alerts, and escalate interrupts to hardware-based responses if the processor 202 does not clear an issued interrupt. The alert handler 204 can therefore act—e.g., as a stand-in for security responses—if the processor cannot or does not handle a security alert.

In some architectures, a security alert is intended to be a rare event, at least relative to "standard" interrupts. Accordingly, at a design stage, a possible event may be designated as an alert event to the extent the event is expected to not happen frequently and if the event has potential security consequences. Examples of such events are parity errors (which might indicate an attack), unauthorized actions on cryptographic or security-related components, sensed values from physical sensors indicating environmental modification (e.g., voltage or temperature), and so forth. The system routes alerts through the alert handler 204, which converts the alerts to interrupts for the processor 202 to potentially address. An underlying expectation, for some implementations, is that a secure operating system has a protocol for handling in software any such interrupt that arises due to an alert. If so, the secure operating system can usually resolve the interrupt and then clear the interrupt with the alert handler 204.

Each peripheral device 250 can present a list of individual alerts that represent respective potential threats to be handled. Peripheral devices can transmit an alert as an alert indication to the alert handler 204 using a particular encoding mechanism. In some implementations, the processor 202 may also send an alert to the alert handler 204, such as to initiate a hardware-controlled mechanism, a circuit reset, and so forth.

The security circuitry 106 can also include the RNG 232. Generally, randomness can contribute to the security functionality by providing variations in execution that can keep attackers from predicting a good time to launch an attack. A random number, for instance, can provide secret material used for identity and cryptographic purposes. The RNG 232 can be seeded into algorithmic computation to obscure sensitive data values. Generally, the RNG 232 provides better performance as its number generation increasingly becomes truly random and to the extent it can also be hardened against attack. The RNG 232 may be implemented as a "true" RNG (TRNG), which may involve a design having an analog portion to take advantage of some physical event or process that is non-deterministic. Example TRNG designs rely on metastability, electronic noise, timing variations, thermal noise, quantum variation, and so forth. The TRNG filters the resulting variable(s) and sends them into a pool of entropy that the device can sample at a given time for a current randomized function. In some cases, an interface to the entropy pool can include a read request of available random bits. The TRNG interface indicates how many bits are available, and the requesting peripheral device or software can read from this pool to the extent bits are available. Attempted reading of entropy bits that are not available can trigger an interrupt or an alert.

Two other peripheral devices 250 include the timer 234 and the flash controller 216, the latter of which is described in the following paragraph. The timer 234 can, for example, support accurate performance by the processor 202. The timer 234 is formed from multiple bits (e.g., 64 bits) and operates as a free-running timer with a guaranteed frequency to within some percentage. Another timer (not explicitly shown) can act as a watchdog timer to backstop the processor 202 in case the processor becomes unresponsive. The unresponsiveness may be due to development code that is wedged, a security attack, and so forth.

The flash controller 216 controls the flash memory 210, which is available for code/instructions and data storage. The primary read path for this data can be in the standard memory address space. Writes to that address space can be ignored, however, because flash is not written to in a standard way. Instead, to write to the flash memory 210, software interacts with the flash controller 216. The flash functionality can include three primary commands: read, erase, and program. Read commands can be standardized and can use the chip memory address space. Erase commands are performed at a page level, where the page size is parameterizable by the flash controller 216. Security is a concern because secret data may be stored in the flash memory 210. Some memory protection can therefore be provided by the flash controller 216.

The security circuitry 106 is depicted in FIG. 2 with a particular set of circuit components. A given security circuitry 106 can, however, have more, fewer, or different circuit components. The circuit components may also be interconnected differently or operate in manners besides those example manners described above. Further, some circuit components may be omitted while other circuit components are implemented in multiple instances. For example, the alert handler 204 may be duplicated or distributed, or multiple AES encryption engines 212 may be present in some security circuitry 106. Further, a GPIO interface 220 may be omitted from among the peripheral devices 250 of security circuitry 106 for IC chips in which the security circuitry 106 forms but one core among dozens.

As illustrated in FIG. 2, at least one processor of the security circuitry 106 can include a register file 112. As shown, the processor 202 can include a first register file 112-1 that includes or is associated with one or more integrity blocks storing at least one integrity code 114. Alternatively or additionally, the cryptographic processor 280 can include a second register file 112-2 that includes or is associated with one or more integrity blocks that can store at least one integrity code 114. Although two processors are shown in FIG. 2, circuitry may have more or fewer processors with a protected register file 112 as described herein. Also, general circuitry, which is not necessarily tuned for security, can include a processor with a protected register file 112.

The security circuitry 106 (e.g., of FIGS. 1 and 2) can include comportable circuit components, including the peripheral devices 250. This document next describes example approaches to making peripheral devices comportable. Each peripheral device 250 can adhere to comportability specifications for the security circuitry 106. By adhering to a comportability specification that defines at least one interface scheme or communication protocol, a peripheral device 250 is realized with at least one interface that produces consistent and expected interactions between the peripheral device 250 and other peripheral devices. This produces increased communication predictability and certainty and decreases the time involved to design and test security circuitry.

Figure 3:
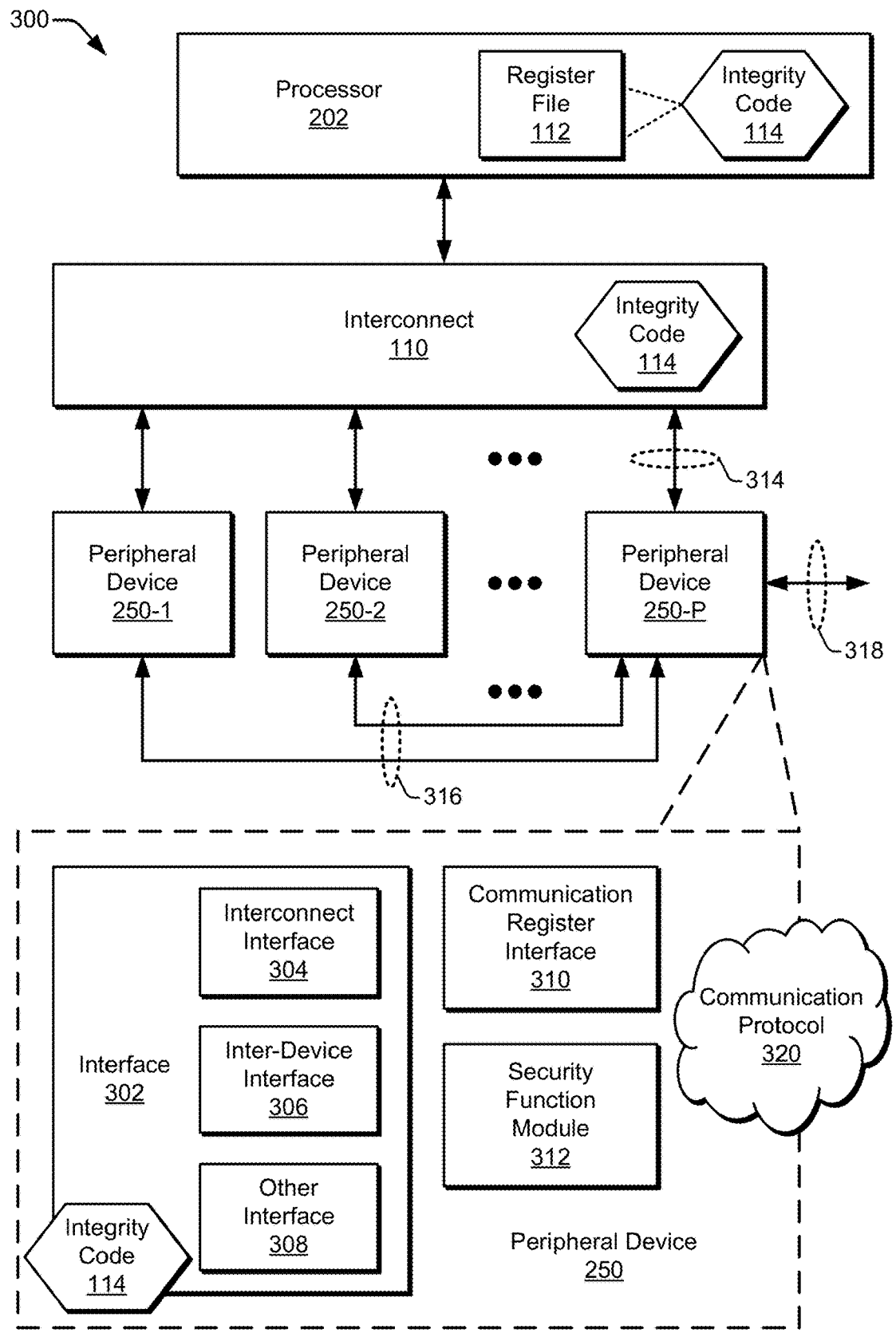
FIG. 3 illustrates an example peripheral device including at least one interface to support comportability with other circuit components or to enable protected communications via an interconnect.

FIG. 3 illustrates, at 300 generally, an example peripheral device 250 (in the lower half of FIG. 3) including at least one interface 302 to support comportability with other circuit components. More generally, FIG. 3 includes an interconnect 110, a processor 202 coupled to the interconnect 110, and multiple peripheral devices coupled to the interconnect 110 (as depicted in the upper half of FIG. 3). Thus, the multiple peripheral devices can at least be coupled to the processor 202 via the interconnect 110. Each peripheral device 250 may, however, also be coupled to the processor 202 directly or otherwise without using the interconnect 110. FIG. 3 explicitly depicts P peripheral devices 250-1, 250-2, . . . , 250-P, with P representing a positive integer.

In example implementations, each peripheral device 250 includes at least one interface 302 that enables the peripheral device 250 to adhere to a communication framework that provides certainty for interoperating peripheral devices. For example, the interface 302, or communication interface 302, can enable the peripheral device 250 to implement at least one communication protocol 320. The interface 302 includes at least one interconnect interface 304, at least one inter-device interface 306, and at least one other interface 308. These interfaces are described below. As shown, the peripheral device 250 also includes at least one communication register interface 310 and at least one security function module 312. Generally, the interface 302 enables the peripheral device 250 to adhere to a common framework for interacting with the processor 202 or with other peripheral devices of the multiple peripheral devices 250-1 . . . 250-P.

The communication register interface 310 includes one or more communication registers or communication register entries. Each communication register entry can be used, for example, for communication to or from (e.g., for communication into or out of) the peripheral device 250. For example, the processor 202 or another peripheral device can set or clear a communication register entry or can load a communication register entry with a value to communicate with the peripheral device 250. Conversely, the peripheral device 250 may change a value of a communication register entry to communicate with the processor 202 or another peripheral device. To enable this communication, the peripheral device 250 can expose at least part of the communication register interface 310 to the processor 202 or another peripheral device. For instance, the peripheral device 250 can provide the processor access to clear an interrupt state indication.

Generally, the group of communication registers can be used to communicate with the remainder of the peripheral logic to manage configuration and status communication, e.g., with software. In some cases, the communication register interface 310 can be implemented using control and status (communication) registers (CSRs). The CSRs provide a collection of communication registers within a peripheral device 250, the communication registers of which are addressable at least by the local host processor 202 via a circuit-wide, or chip-wide, address map. The CSRs can be standardized to enhance software uniformity and to facilitate circuit reuse and documentation consistency.

The security function module 312 implements a security-related function of the peripheral device 250. Security-related functions include core or primary security functions and supporting or secondary security functions. Core security functions can include, for example, alert handling, cryptographic operations including encrypting and decrypting, random-number generation, secure data storage including storing and accessing secret data (e.g., key management), and so forth. Supporting security functions can include those that enable or facilitate performance of the core functions. Examples of supporting security functions include memory storage, memory control, timing, circuit and chip I/O control, environmental sensors, bus hosting, and so forth.

The interface 302 generally, or any of the specific example interfaces (e.g., the interconnect interface 304, the inter-device interface 306, or the other interface 308), can establish at least one communication register for the communication register interface 310 to enable a respective interface communication capability or feature. Regarding the interconnect interface 304, the interconnect interface 304 implements a communication interface that couples to the interconnect 110 to enable, for example, a connection between the peripheral device 250 and the processor 202 that adheres to a common framework. With the peripheral device 250 and the processor 202 comporting with the same common framework, device-processor communications in both directions can be standardized and predictable. The interconnect interface 304 can operate across the interconnect 110, can use at least one communication register of the communication register interface 310, can use a separate bus or independent wires, some combination thereof, and so forth. In operation, the peripheral device 250 can use the interconnect interface 304 to engage in at least one interconnect communication 314. Additionally or alternatively, the peripheral device 250 may use the interconnect interface 304 to communicate with another peripheral device via the interconnect 110.

The inter-device interface 306 implements a communication interface between the peripheral device 250 and one or more other peripheral devices that adhere to a common framework. With the peripheral device 250 and each other peripheral device comporting with the same common framework, device-to-device communications in both directions can be standardized and predictable. The inter-device interface 306 can use at least one communication register of the communication register interface 310, can use a bus dedicated to the peripheral devices, can use one or more independent wires extending between two peripheral devices, some combination thereof, and so forth.

In operation, the peripheral device 250 can use the inter-device interface 306 to engage in at least one inter-device communication 316. By bypassing the interconnect 110 to communicate with another peripheral device, the peripheral device 250 can communicate "directly" with the other peripheral device in some implementations. Further, by establishing and adhering to an inter-device communication scheme, consistency and certainty are promoted for communications between two or more devices. Accordingly, designers can focus on achieving the intended security-related function of the security function module 312 instead of expending time and resources tracking and double-checking numerous ad hoc communication regimes.

The other interface 308 implements a communication interface between the peripheral device 250 and another circuit component that adheres to a common framework. With the peripheral device 250 and the other circuit component comporting with the same common framework, peripheral device signaling in both directions can be standardized and predictable. An example of the other interface 308 is a chip I/O interface for communicating information externally. A second example of the other interface 308 is an interrupt interface, e.g., if interrupts are not communicated fully via the interconnect 110. A third example of the other interface 308 is a clock interface.

In some cases, the security circuitry 106 (not separately indicated in FIG. 3) includes a primary system clock and one or more secondary system clocks. A clock interface (not shown) of the peripheral device 250 can utilize the primary system clock and at least a selected portion of the secondary system clocks for communication timing and general functionality. The clock interface can operate in accordance with a clock scheme for the security circuitry 106, and design code for the peripheral device 250 can specify the clocks that are relevant to the peripheral device 250. In operation, the peripheral device 250 can use the other interface 308 to engage in at least one other communication 318 with another circuit component, like I/O circuitry or a clock tree.

As shown in FIG. 3, the processor 202 can have at least one register file 112 that includes or is associated with one or more integrity codes 114. Example implementations for a register file 112 and at least one integrity code 114 are described below with reference to FIG. 4 et seq. As depicted in FIG. 3, the interconnect 110 or the interface 302 (including both in some cases) can provide a mechanism to transport, couple, or otherwise utilize at least one integrity code 114 to facilitate information protection, including information stored, to be stored, or previously stored in a register file 112 of the processor 202. The interconnect 110 can propagate an integrity code 114 (e.g., in conjunction with a register value 408) as described below with reference to FIG. 7.

As also described below with reference to FIG. 7, the interface 302 can buffer the integrity code 114, along with the register value 408, for coupling these bits to or from the peripheral device 250. The interconnect interface 304, for example, may have at least one latch for coupling the integrity code 114 and the register value 408 between the peripheral device 250 and the interconnect 110. As described further below, including the ability to hold or carry the register value 408 and the integrity code 114 in or around various circuit components can extend protection of the information of the register value 408. This protection can be extended without necessarily requiring the integrity code 114 to be recomputed at each component.

Having generally described schemes, techniques, and hardware for various security circuitry implementations, including for an example processor and an example peripheral device such as one for secure cryptographic processing, this discussion now turns to schemes, techniques, and hardware for register file protection.

Example Schemes, Techniques, and Hardware for Register File Protection

Figure 4:
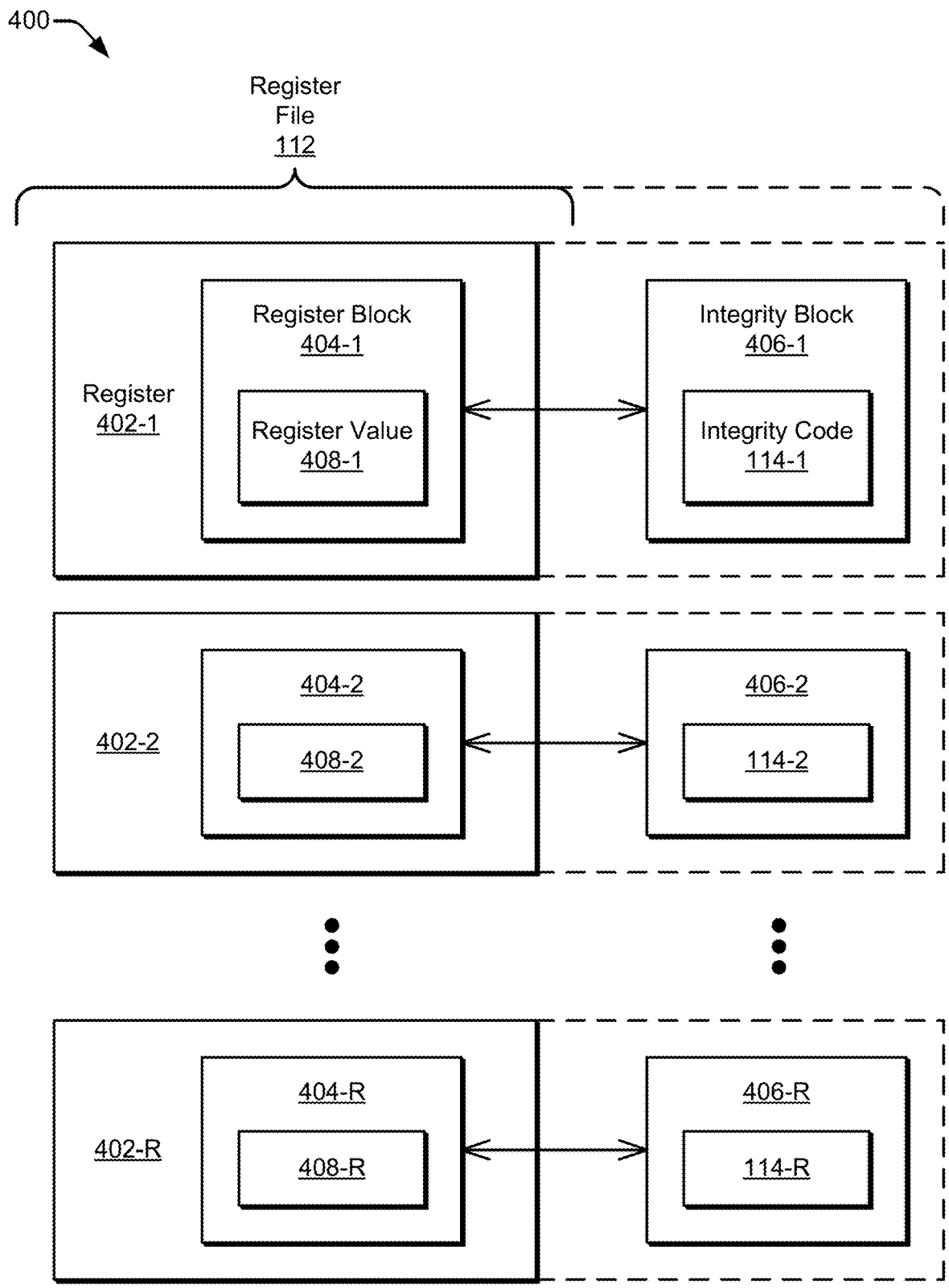
FIG. 4 illustrates an example register file including multiple register entries that each include a register block that is associated with an integrity block.

FIG. 4 illustrates, at 400 generally, an example register file 112 including multiple register entries that each include a register block 404 that is associated with an integrity block 406. As shown, the register file 112 includes multiple registers 402-1, 402-2, . . . , 402-R, with R representing a positive integer. Each respective register 402 (which may also be referred to as a processor register or a register entry) includes a respective register block 404. Each respective register block 404 can include or store a respective register value 408. To facilitate protection of the code being executed and the information operated on by the processor, the register file 112 can include or be associated with at least one integrity code 114.

In example implementations, the multiple registers 402-1, 402-2, . . . , 402-R of the register file 112 respectively include multiple register blocks 404-1, 404-2, . . . , 404-R. Thus, the register file 112 can include the multiple register blocks 404-1, 404-2, . . . , 404-R. The multiple register blocks 404-1, 404-2, . . . , 404-R can respectively include or store multiple register values 408-1, 408-2, . . . , 408-R. Each respective register block 404 can include or store a respective register value 408. A first register 402-1 includes a first register block 404-1 that can store a first register value 408-1. A second register 402-2 includes a second register block 404-2 that can store a second register value 408-2. An "Rth" register 402-R includes an "Rth" register block 404-R that can store an "Rth" register value 408-R.

The register file 112 can include, or at least be associated with, at least one integrity block 406. As illustrated, FIG. 4 includes multiple integrity blocks 406-1, 406-2, . . . , 406-R, with R representing the same or a different integer as that for the quantity of register blocks. The multiple integrity blocks 406-1, 406-2, . . . , 406-R can respectively include or store multiple integrity codes 114-1, 114-2, . . . , 114-R. Each respective integrity block 406 can include or store a respective integrity code 114. Thus, a first integrity block 406-1 can store a first integrity code 114-1, and a second integrity block 406-2 can store a second integrity code 114-2. An "Rth" integrity block 406-R can store an "Rth" integrity code 114-R.

Each respective integrity block 406 of the multiple integrity blocks 406-1, 406-2, . . . , 406-R is associated with a respective register block 404 of the multiple register blocks 404-1, 404-2, . . . , 404-R. Accordingly, each respective integrity code 114 of the multiple integrity codes 114-1, 114-2, . . . , 114-R corresponds to (e.g., is derived from) a respective register value 408 of the multiple register values 408-1, 408-2, . . . , 408-R. The integrity code 114 can be realized using at least one error-checking code, at least one detection code, at least one error correction code (ECC), a combination thereof, and so forth. Generally, the integrity code 114 may be implemented using, for example, a single parity bit up to a full complimentary redundancy scheme. Example algorithms or techniques to compute an integrity code 114 based on a corresponding register value 408 include a Hamming code, a Single Error Correction-Double Error Detection (SEC-DED) code, a Hsiao code, a combination thereof, and so forth.

Generally, an integrity code 114 is derived from a corresponding register value 408 such that at least a one-bit change to the register value 408 can be detected. Further, multiple changed bits may be detectable, one changed bit may be correctable, multiple changed bits may be correctable, and so forth depending on the encoding scheme used. Thus, an integrity code 114 can be used to determine if a register value 408 has been corrupted (e.g., has at least one bit that has changed unintentionally) to become a corrupted register value since the integrity code 114 was determined for the register value 408. The integrity code 114 can be used to detect at least one error, correct at least one error, detect and correct at least one error, and so forth. Using an integrity code 114 or register file protection is described further herein.

The multiple register blocks 404-1, 404-2, . . . , 404-R and the multiple integrity blocks 406-1, 406-2, . . . , 406-R may be arranged or organized on an IC chip in any manner. In some cases, the register file 112 includes the multiple integrity blocks 406-1, 406-2, . . . , 406-R in addition to the multiple register blocks 404-1, 404-2, . . . , 404-R. In such cases, each register 402 may include a register block 404 and an associated integrity block 406. In other cases, the multiple integrity blocks 406-1, 406-2, . . . , 406-R may be separate from the multiple registers 402-1, 402-2, . . . , 402-R and/or the register file 112. The multiple integrity blocks 406-1, 406-2, . . . , 406-R may be co-located with the multiple register blocks 404-1, 404-2, . . . , 404-R by being proximate to each other, adjacent to one another, and/or by being part of the same multiple registers 402-1, 402-2, . . . , 402-R. Alternatively, the multiple integrity blocks 406-1, 406-2, . . . , 406-R may be positioned remote from the multiple register blocks 404-1, 404-2, . . . , 404-R.

Regardless of physical proximity, respective pairs of the multiple register blocks 404-1, 404-2, . . . , 404-R and the multiple integrity blocks 406-1, 406-2, . . . , 406-R may be linked from an addressing or accessing perspective. In such cases, accessing a respective register block 404 to retrieve or store a register value 408 can likewise or jointly access the associated integrity block 406 to retrieve or store a corresponding integrity code 114. For example, accessing a particular register block 404 with a designated register address to store a register value 408 can also store an integrity code 114, which corresponds to the register value 408, in the integrity block 406 that is associated with the same register address.

In some processors, register addresses are organized in a register address space that is separate from the general address space for system memory. For instance, register addresses may be realized using numerical register addresses (e.g., R1, R2, and R3). For ease of jointly accessing register values and integrity codes, and to facilitate monitoring the integrity of the register values, each respective register 402 can include a respective register block 404 and a respective integrity block 406 and may be configured to store a respective register value 408 and a respective integrity code 114. The register 402 can provide the register value 408 and the integrity code 114 in response to an access using a single register address.

Each register block 404 can be implemented in different manners. For example, each register block 404 can be realized using synchronous random-access memory (SRAM). Alternatively, each register block 404 can be realized using multiple flip-flops. In at least some circuitries, a flip-flop can be accessed (e.g., read from or written to) more quickly than SRAM. In operation, the multiple register blocks 404-1, 404-2, . . . , 404-R can include a register block 404 that is configured to store a data value having multiple bits using multiple flip-flops. Each flip-flop of the multiple flip-flops of the register block 404 can store a bit of the multiple bits. An integrity block 406 can be constructed in a same or a different manner as compared to the associated register block 404.

Figure 5:
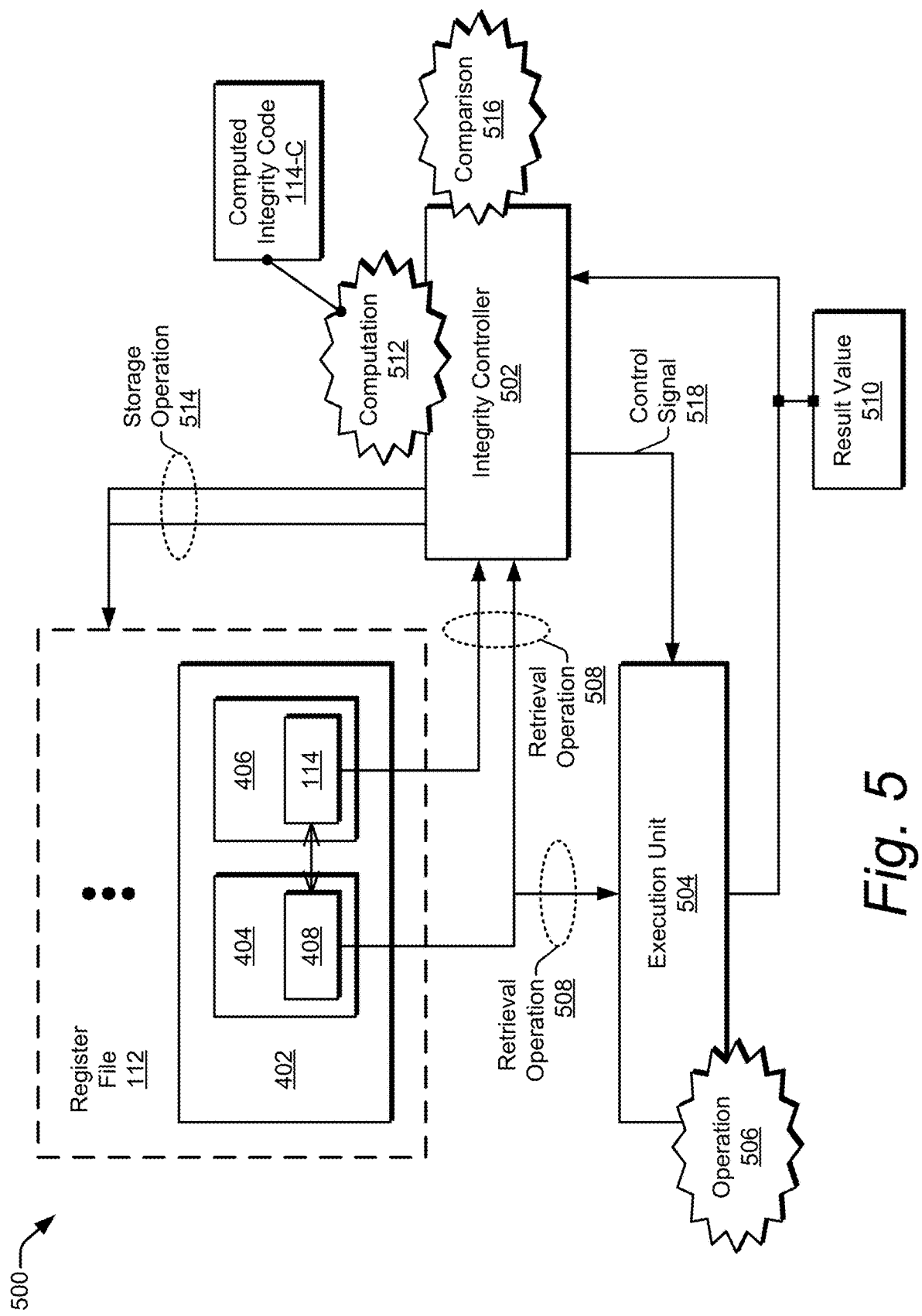
FIG. 5 illustrates an example processor that includes a register file, an integrity controller, and an execution unit.

FIG. 5 illustrates an example processor 500 that includes at least one register file 112, at least one integrity controller 502, and at least one execution unit 504. In this example, an integrity block 406 is part of a register 402 of the register file 112; however, the described principles are applicable to other arrangements. As shown, the execution unit 504 is coupled to at least the register file 112, and the integrity controller 502 is coupled to at least the register file 112 and the execution unit 504. The integrity controller 502 can access the register file 112 to monitor the integrity of the register value 408 using the integrity code 114. The execution unit 504 can access the register file 112 to load operands from or to save results into the register file 112.

In example implementations, the execution unit 504 executes code by performing at least one operation 506 (e.g., an execution operation 506). Although only certain components are shown, the processor 500 can include one or more other components, such as at least one instruction scheduler, at least one instruction decoder, or multiple execution units. The execution unit 504 can be realized in any of multiple manners. Examples of the execution unit 504 include an arithmetic logic unit (ALU), a multiply-accumulate unit, a floating-point unit (FPU), an address generation unit (AGU), a combination thereof, and so forth.

To perform an operation 506, the execution unit 504 can obtain one or more operands using at least one retrieval operation 508 with the register file 112. The retrieval operation 508 reads at least one register value 408 from at least one register block 404 of the register file 112. In some cases, the execution unit 504 can access two or more register blocks 404 of the multiple register blocks using two or more register addresses (e.g., R1 and R2) during a single operational cycle to obtain two or more operands for an operation 506. Thus, the register file 112 can enable simultaneous access to two or more registers 402 for reads and/or writes.

Based on the type of execution unit, the execution unit 504 can perform the operation 506 using at least one operand retrieved from the register 402 to produce at least one result, which is depicted as a result value 510. The integrity controller 502 obtains the result value 510, such as by receiving it from the execution unit 504. To provide integrity protection on the newly created value, the integrity controller 502 can perform a computation 512. To do so, the integrity controller 502 can compute a computed integrity code 114-C based on the result value 510 using an integrity code procedure, technique, scheme, or algorithm, as described herein. Alternatively, the integrity controller 502 may obtain the computed integrity code 114-C from another component that computes the code from the result value 510.

After obtaining the computed integrity code 114-C via the computation 512 or via a request from another component (not shown), the integrity controller 502 can store the computed integrity code 114-C in association with the register value 408. The integrity controller 502 can perform a storage operation 514 with the register file 112. For example, the integrity controller 502 can store the result value 510 as another register value 408 in another register block 404 (not explicitly shown in FIG. 5) and store the computed integrity code 114-C as another integrity code 114 in another integrity block 406 (not explicitly shown in FIG. 5). This write or these writes can be performed as a joint operation, such as a single combined operation, or as multiple (e.g., two separate) write operations. Including the computed integrity code 114-C enables the newly determined result value 510 to be protected from an unknown corruption while in the register file 112.

The storing operation for the result value 510 can be performed in different manners. For example, the execution unit 504 can store the result value 510 as another register value 408 in another register block 404, and the integrity controller 502 can store the computed integrity code 114-C as another integrity code 114 in another integrity block 406. Alternatively, the integrity controller 502 can return the computed integrity code 114-C to the execution unit 504, and the execution unit 504 can store the result value 510 and the computed integrity code 114-C. The storing operation(s) can be performed in any order, partially overlapping in time, or substantially simultaneously.

As shown in FIG. 5, the integrity controller 502 may operate at least partially in parallel with the execution unit 504. Alternatively, the integrity controller 502 can operate in series with the execution unit 504. For example, the integrity controller 502 can operate "after" the execution unit 504 to ratify or sanction a result value 510. Instead, the integrity controller 502 can operate "before" the execution unit 504 to thereby gate access to the multiple register values 408-1, 408-2, . . . , 408-R (as explicitly shown in FIG. 4) by permitting access to a register value 408 after the integrity thereof has been verified.

In some implementations, the integrity controller 502 is coupled to the multiple register blocks 404-1, 404-2, . . . , 404-R (shown explicitly in FIG. 4) and the multiple integrity blocks 406-1, 406-2, . . . , 406-R (e.g., also of FIG. 4). The integrity controller 502 can monitor the multiple register values 408-1, 408-2, . . . , 408-R based on the multiple integrity codes 114-1, 114-2, . . . , 114-R in one or more manners that are effective to prevent use of a register value 408 of the multiple register values 408-1, 408-2, . . . , 408-R that is corrupted. This protection can be provided if the corruption is due to a manufacturing defect, an environmental force (e.g., EM radiation or extreme heat), a physical attack, and so forth. By including the multiple integrity codes 114-1, 114-2, . . . , 114-R in the processor 500, and thus potentially "nearer" the location of the use of the corresponding multiple register values 408-1, 408-2, . . . , 408-R, corruption of the register values can be detected across a wider area of potential attacks across secure IC as compared to those processors that lack integrity codes for a register file. The protection can also be provided "nearer" in time to the use of the register value 408 by an execution unit 504.

As part of a protection regime, the integrity controller 502 can check the register value 408 using the corresponding integrity code 114 in several circumstances. Such circumstances include checking repeatedly based on an internal timer (e.g., at regular intervals), checking responsive to an access by the execution unit 504, checking responsive to an external event or alert, checking during each cycle or at each "nth" cycle, and so forth. In the depicted example, the integrity controller 502 obtains the register value 408 and the integrity code 114 as part of the retrieval operation 508. This retrieval operation 508 for the integrity controller 502 can be the same as the retrieval operation 508 for the execution unit 504 or a different retrieval operation. The register value 408 and the integrity code 114 can, for instance, be shunted to the integrity controller 502 responsive to an access of a register 402 by the execution unit 504. Alternatively, the integrity controller 502 can affirmatively retrieve the register value 408 and the integrity code 114 by issuing a load request to the register file 112.

To provide protection for the information values held in the register file 112, the integrity controller 502 can determine if a current version of the register value 408 comports with the version of the register value 408 that existed when the corresponding integrity code 114 was initially computed. In example operations, the integrity controller 502 can obtain a computed integrity code 114-C based on the register value 408 as it currently exists in the register block 404. The integrity controller 502 can obtain the computed integrity code 114-C via the computation 512 or by sending a request to another component and receiving a code in response. The integrity controller 502 can perform a comparison 516 that includes the computed integrity code 114-C and the integrity code 114 that was retrieved from the register file 112 and that corresponds to the register value 408.

The integrity controller 502 can then selectively implement a protective measure responsive to the comparison 516. The comparison 516 may reveal that the computed integrity code 114-C matches the integrity code 114 or fails to match the integrity code 114 from the processor register 402. Responsive to the computed integrity code 114-C matching the integrity code 114, the integrity controller 502 can provide an authorization control signal to the execution unit 504. The authorization control signal can be realized using a control signal 518 as shown. Additionally or alternatively, the integrity controller 502 may permit operational processing to continue without interruption (e.g., without stoppage or deviation) caused by the integrity controller 502.

Responsive to the computed integrity code 114-C failing to match a respective integrity code 114, one or more of many different protective measures can be implemented, a few examples of which are set forth here. First, the integrity controller 502 can block usage of a corresponding respective register value 408. Similarly, the integrity controller 502 can block use of the result value 510 that is or was produced using the respective register value 408. Third, the integrity controller 502 can correct the respective register value 408 of a respective register block 404 using the respective integrity code 114 (e.g., if the integrity code 114 enables correction as well as detection). Fourth, at least a portion of code that uses the respective register value 408 may be re-executed based on a command from the integrity controller 502. Fifth, the integrity controller 502 can trigger an alert or use another mechanism to cause at least the processor 500 (or another portion) of security circuitry 106 of an integrated circuit 104 to be reset.

In some implementations, including with security-oriented circuitry, a processor may have multiple (e.g., two or more, including dual) execution units 504 that are operated in "lockstep." For example, two execution units 504 can execute the same instructions and operate on the same operand data. A second execution unit can be offset in time by, e.g., two clock cycles relative to a first execution unit. Thus, the second execution unit can receive the same inputs as the first execution unit but buffered for two cycles. The outputs of the second execution unit are compared against the outputs of the first execution unit as buffered for the two cycles. Any mismatch in outputs can trigger an alert, such as a fatal alert.

The security circuitry can, therefore, verify that the output results of the multiple execution units 504 match each other to help with attack detection. In some cases, the register file 112 can likewise be replicated per execution unit 504. In other cases, to achieve an appreciable area savings, a hardware designer may decline to replicate the register file 112. Instead, the security circuitry can rely on the integrity codes 114 of the integrity blocks 406 and at least one integrity controller 502 to protect the register values 408 of the register blocks 404. In such cases, the integrity controller 502 may be replicated for each of the execution units. In these manners, integrity checking with register files can be employed with multiple execution units while avoiding replicating a register file having register values and corresponding integrity codes.

Figure 6:
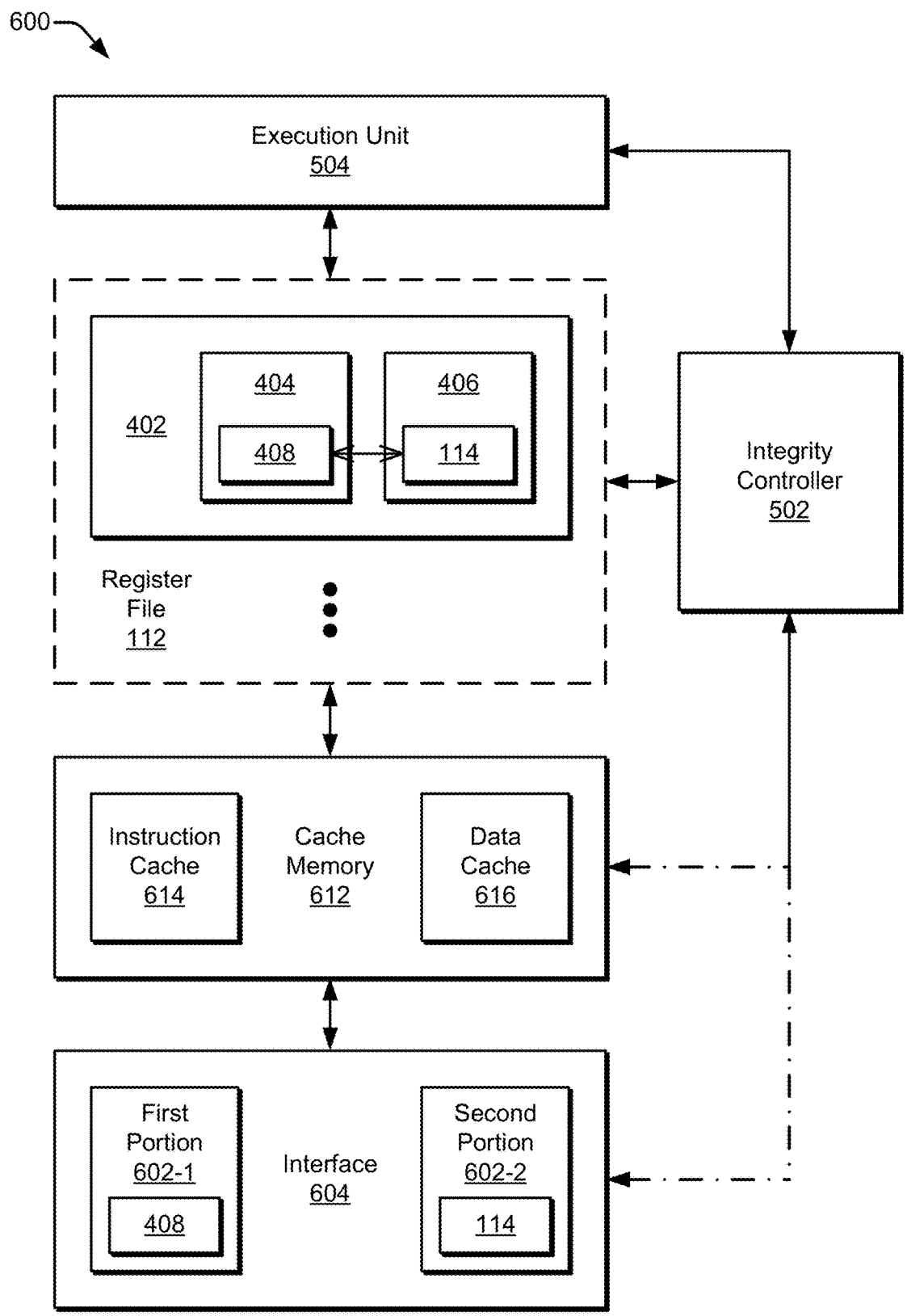
FIG. 6 illustrates an example processor that includes a register file, an integrity controller, an execution unit, a cache, and an example interface for the processor.

FIG. 6 illustrates an example processor 600 that includes at least one register file 112, at least one integrity controller 502, at least one execution unit 504, at least one cache memory 612, and an example of at least one interface 604 for the processor 600. As shown for an example implementation, the register file 112 is coupled between the execution unit 504 and the cache memory 612. The register file 112 includes a register or register entry 402 having a register block 404 and an integrity block 406 that is associated with the register block 404. The register block 404 can store a register value 408, and the integrity block 406 can store an integrity code 114 that is derived from the register value 408. Generally, the register file 112 can store "working" values for the execution unit 504 or serve/operate as a scratchpad for operands for and results of code execution. Each register value 408 can comprise information that corresponds to a data value, an instruction value (e.g., a program counter), an address value (e.g., a register address or system memory address), and so forth.

In example implementations, the register file 112 can function as memory that is interposed or coupled between the execution unit 504 and the cache memory 612. The cache memory 612 can represent an L1 cache, an L2 cache, and so forth. As shown, the cache memory 612 realizes an L1 cache that can include one or more caches or cache portions. Two example caches or cache portions are shown: an instruction cache 614 and a data cache 616. In other architectures, the cache memory 612 may be omitted from the processor 600, or the execution unit 504 may be capable of accessing the cache memory 612 "directly" (e.g., without loading through the register file 112).

As illustrated, the processor 600 includes at least one interface 604. The interface 604 can couple to an inter-component interconnect, which is described below with reference to the interconnect 110 of FIG. 7. The interface 604 can enable an integrity protection scheme to extend across multiple components without reencoding the integrity codes. The interface 604 enables the processor 600 to receive a register value 408 and a corresponding integrity code 114 from another component and/or to provide a register value 408 and a corresponding integrity code 114 to another component.

The interface 604 is coupled to the multiple register blocks 404-1, 404-2, . . . , 404-R and the multiple integrity blocks 406-1, 406-2, . . . , 406-R. The interface 604 can include multiple portions 602, such as the two portions that are depicted. Each portion 602 may include a certain quantity of bits to buffer a corresponding register value or integrity code. The interface 604 includes a first portion 602-1 that can buffer a respective register value 408 of a respective register block 404. The interface 604 also includes a second portion 602-2 that can buffer a respective integrity code 114 of a respective integrity block 406.

The integrity controller 502 is coupled to at least the multiple integrity blocks 406-1, 406-2, . . . , 406-R and the interface 604. In the example architectures of FIG. 6, the integrity controller 502 may be "indirectly" coupled to the interface 604 via the cache memory 612 or "directly" coupled to the interface 604. In example operations, the integrity controller 502 may control transport of the respective register value 408 between the first portion 602-1 of the interface 604 and the respective register block 404 based on the respective register value 408 and the respective integrity code 114. For instance, the integrity controller 502 may permit, may authorize, or may order the transport to the register file 112 if the register value 408 is verified as being uncorrupted based on the integrity code 114 and may block or decline to authorize/order the transport if the register value 408 cannot be verified using the integrity code 114.

Figure 7:
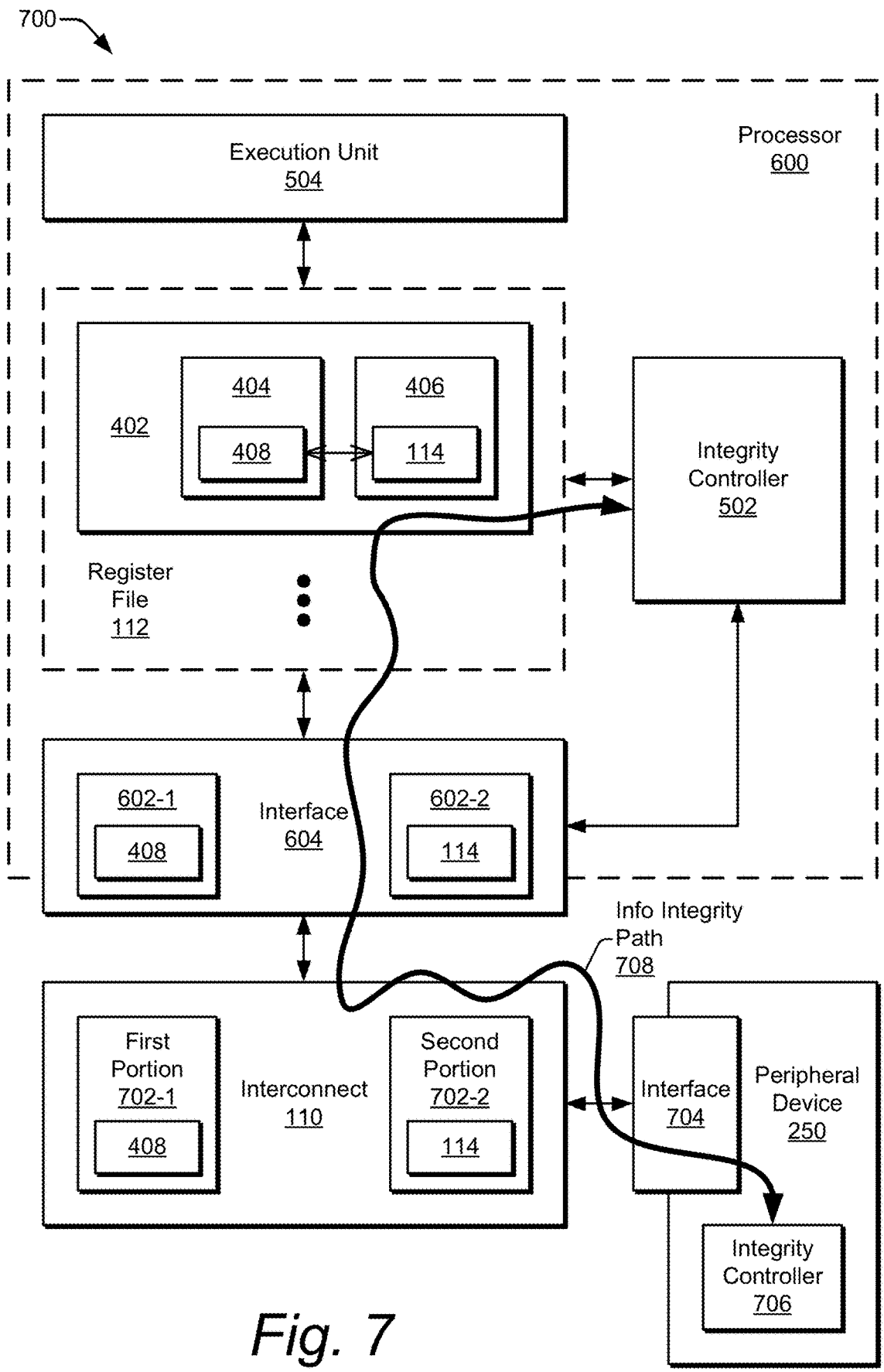
FIG. 7 illustrates an example processor including an interface that is coupled to an example interconnect and peripheral device.

FIG. 7 illustrates, generally at 700, an example processor 600 including an interface 604 that is coupled to an example interconnect 110 and an example peripheral device 250. FIG. 7 depicts an example information integrity path 708 that enables multi-component information protection. Further, the information protection can extend across multiple components without necessarily reencoding the integrity code at each component by propagating a respective integrity code with the corresponding respective register value over the interconnect 110. By way of example, the processor 600 of FIG. 7 omits a cache memory between the register file 112 and the interface 604; however, the principles are applicable to other architectures than the ones illustrated, including to the ones of FIG. 6.

In example implementations, the interconnect 110 is coupled to the processor 600 via the interface 604. The interconnect 110 includes multiple portions, such as a first portion 702-1 and a second portion 702-2. The first portion 702-1 can propagate a respective register value 408 of a respective register block 404. The second portion 702-2 can propagate a respective integrity code 114 of a respective integrity block 406. Here, the respective register block 404 is associated with the respective integrity block 406, and the respective register value 408 corresponds to the respective integrity code 114.

As shown, the peripheral device 250 includes an interface 704 and an integrity controller 706. The interface 704 can be implemented similarly or analogously to the interface 604 of the processor 600, and the integrity controller 706 can be implemented similarly or analogously to the integrity controller 502 of the processor 500 or 600. Further, the interface 704 can be realized using the interoperability and/or compatibility principles described above for the interconnect interface 304 and/or the interface 302 (both of FIG. 3). In operation, the peripheral device 250 can receive a register value 408 and a corresponding integrity code 114 from the processor 600 via the interface 604, the interconnect 110, and the interface 704 along at least part of the information integrity path 708. The peripheral device 250 may store the received register value 408 in association with the received integrity code 114 in one or more blocks, processor registers (e.g., if the peripheral device is a processor), buffers, or other memory storage units.

Using the integrity controller 706, the peripheral device 250 can also generate an integrity code 114 corresponding to a register value 408. Whether generated locally or received from another component, the peripheral device 250 can provide (e.g., transmit or forward) the integrity code 114 corresponding to the register value 408 to another component, such as the processor 600. To do so, the peripheral device 250 can transmit the register value 408 and the integrity code 114 over the interconnect 110 via the interface 704. The interconnect 110 propagates the register value 408 over the first portion 702-1 and the integrity code 114 over the second portion 702-2. In such cases, the interconnect 110 may be sufficiently wide (e.g., have a sufficient quantity of wires) to propagate the integrity code 114 simultaneously with the register value 408 over two portions of wires.

The interconnect 110 can couple the register value 408 and the integrity code 114 to the interface 604 of the processor 600. The processor 600 can therefore receive from the interconnect 110 the register value 408 and the integrity code 114 at the interface 604. The interface 604 can receive the register value 408 via the first portion 602-1 and the integrity code 114 via the second portion 602-2. The processor 600, such as the integrity controller 502 thereof, can store the register value 408 in a register block 404 of the register file 112 of the processor 600. The integrity controller 502 can also store the integrity code 114 in an integrity block 406 of the processor 600, including in a same register 402 of the register file 112 as that of the register block 404.

As described with reference to FIG. 7, an integrity code can be used to provide overarching integrity protection for information without "regularly" reencoding the information, which reencoding can be a potential fault injection point. With a multi-component information integrity path (e.g., like the information integrity path 708), the same integrity code can be used in various portions of an integrated circuit (IC), up to all portions of the IC, to protect the corresponding information. The protection can be applied to 32-bit information words and can produce 39 bits of encoded information, just to provide a single example.

In some cases, an integrity code may be realized with an inverted (e.g., 39, 32) Hsiao SECDED error correction code (ECC). This ECC has a minimum Hamming distance of 4, resulting in the ability to detect at least three errors in a 32-bit word. The code may be used for error detection only; if so, no error correction need be performed. In contrast to the original Hsiao code, the outputs in this version are inverted to produce a code in which the all-zero word (32'h0) is not a valid codeword.

Regarding register files with integrity protection, different processor registers may be covered with a corresponding integrity code. For example, both 32-bit general-purpose registers (GPRs) and 256-bit wide data registers (WDRs) can store an error correction code in addition to the corresponding information to detect glitches in the stored information. Detected errors (e.g., certain categories of errors, uncorrectable errors, or all detected errors) can result in triggering a fatal alert. Each 32-bit information word in a GPR can be protected with an integrity code. In a 256-bit WDR, the integrity code can be applied to each 32-bit word individually.

In some instances, information with "attached" integrity code bits can be consumed and emitted jointly from a register file. If incoming information has no attached integrity code bits, the integrity code can be calculated before writing the information to the register file, e.g., after otherwise validating the integrity of the incoming information in a different manner. Two example aspects regarding integrity codes can include: (1) for data going from/to data memory, the integrity code bits can be passed through; and (2) otherwise, the integrity code bits can be computed for writing to the register file, and the integrity code bits may be stripped from the data when reading from the register file (e.g., with the data going to or coming from an ALU or other execution unit).

Local memory, which can be for data and/or instructions, of a processor may be protected with integrity codes. The local memory may be implemented as a cache memory or may be implemented as a fully local or independent memory. With respect to a data memory, a processor's data memory can be 256 bits wide, but the data memory may allow 32-bit-aligned 32-bit word accesses. The integrity of the data memory can be protected with, for instance, an error detection code. Each (32-bit-aligned) 32-bit data word can be protected with an integrity code. Some detected errors or selected detected errors (e.g., up to all detected errors) can result in a fatal alert.

In some cases, reencoding of the data into data-plus-integrity code can be avoided—e.g., by propagating integrity code bits with corresponding data around the processor's various circuit portions or units. Two example data memory aspects can include: (1) data consumed within the processor may not be reencoded, but the integrity code can be preserved by a load-store unit; and (2) data accessed (e.g., read or written) through a system bus (e.g., to/from other peripheral devices or another processor, which may be the main processor) may be reencoded if the system bus fails to provide or propagate the same type of integrity code.

With respect to instruction memory, the integrity of the instruction memory can also or alternatively be protected with integrity codes. For example, each (32-bit-aligned) 32-bit instruction word can be protected with an integrity code. Some detected errors or selected detected errors (e.g., up to all detected errors) can result in a fatal alert. In some cases, reencoding of an instruction into an instruction-plus-integrity-code can be avoided. Two example instruction memory aspects can include: (1) instructions accessed (e.g., read or written) through a system bus may avoid reencoding unless such system bus does not provide a same type of integrity code; and (2) instructions read by an instruction decoder may be integrity-checked before use, and then the integrity code may be discarded (e.g., absent speculative execution or a similar potential for instruction re-execution).

Having generally described schemes, techniques, and hardware for register file protection, this discussion now turns to example methods.

Example Methods for Register File Protection

Figure 8:
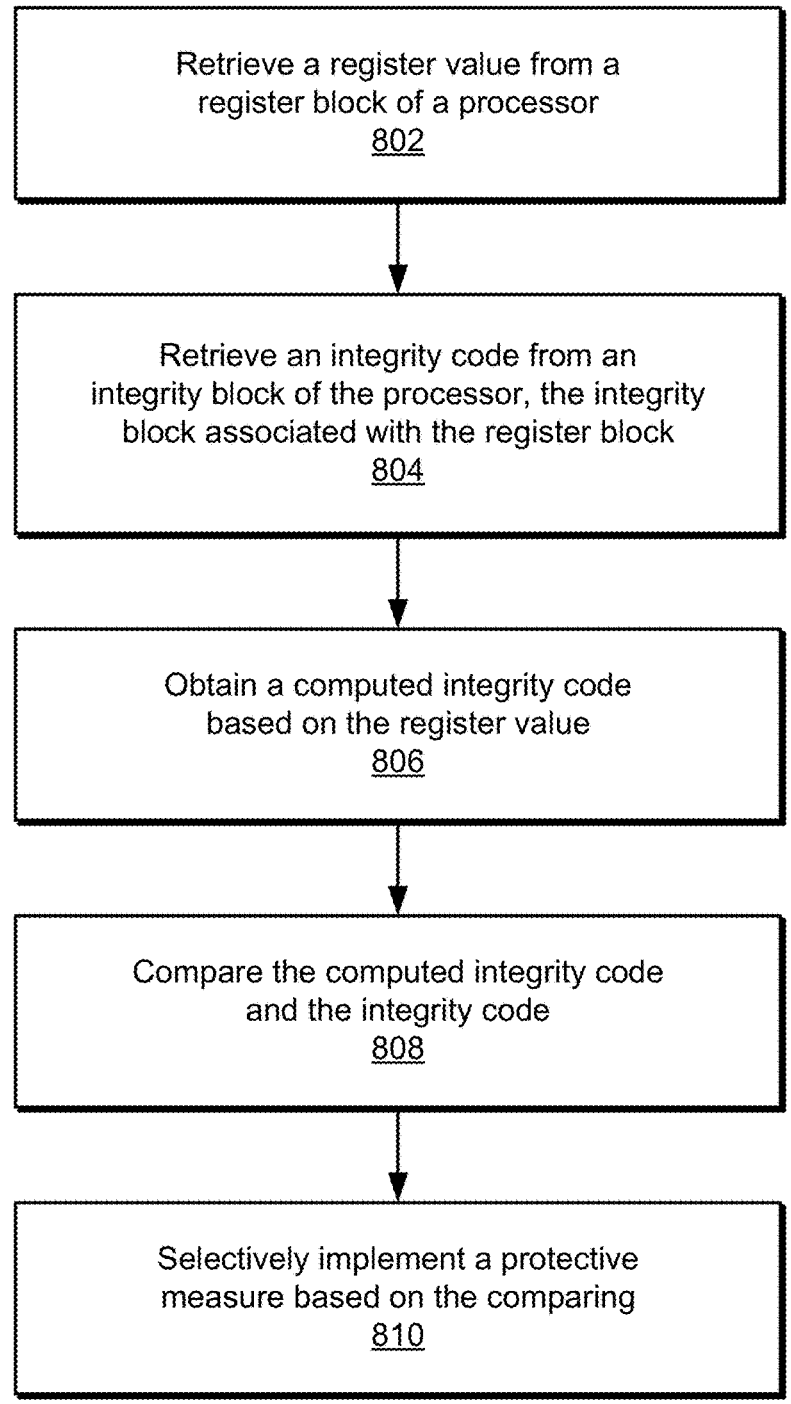
FIG. 8 illustrates example methods for an apparatus to provide protection with regard to a register file of a processor.

Example methods are described in this section with reference to a flow diagram. FIG. 8 illustrates such example methods using a flow diagram 800 in which an apparatus provides protection with regard to information present in a register file of a processor. The flow diagram 800 for protecting a register file includes five blocks 802-810. The operations of the blocks may be performed, for example, by a processor, such as a processor 202, a cryptographic processor 280, a processor 500, a processor 600, and so forth.

At block 802, the processor is retrieving a register value from a register block of the processor. For example, a processor 500 can retrieve a register value 408 from a register block 404 of the processor 500. For instance, an integrity controller 502, an execution unit 504, an instruction scheduler or decoder, some combination thereof, and so forth may perform a retrieval operation 508 to obtain the register value 408 from the register block 404 of a register file 112.

At block 804, the processor is retrieving an integrity code from an integrity block of the processor, with the integrity block associated with the register block. For example, the processor 500 can retrieve an integrity code 114 from an integrity block 406, with the integrity block 406 being associated with the register block 404. In some cases, the register block 404 and the integrity block 406 may be part of a same register 402 and/or may be retrievable responsive to driving a register address for the register 402. Thus, a respective integrity block 406 may be accessed responsive to an access of a respective register block 404. Further, the retrieval of the register value 408 may be performed sequentially or at least partially in parallel with the retrieval of the integrity code 114 using one, two, or more retrieval operations.

At block 806, the processor is obtaining a computed integrity code based on the register value. For example, the integrity controller 502 can obtain a computed integrity code 114-C based on the register value 408. To do so, the integrity controller 502 may compute the computed integrity code 114-C based on the register value 408 using an error checking (e.g., detecting or correcting) scheme or may request the computed integrity code 114-C from another component, which other component may compute integrity codes as a service to various circuit components. The computation 512 may involve application of an error detection algorithm or an ECC algorithm.

At block 808, the processor is comparing the computed integrity code and the integrity code. For example, the integrity controller 502 can compare the computed integrity code 114-C and the integrity code 114. Here, the integrity controller 502 may determine if the computed integrity code 114-C matches the integrity code 114 corresponding to the register value 408 or if the two codes fail to match. If the integrity code 114 fails to match the computed integrity code 114-C, the integrity controller 502 can infer that the register value 408 has been corrupted through happenstance or malicious efforts. In some cases, the obtaining and the comparing may be performed responsive to an access of the register block 404 to retrieve the register value 408 to perform an operation 506 including the register value 408 (e.g., as an operand of the operation 506). In other cases, the integrity controller 502 may perform the obtaining and the comparing at regular intervals, in response to another event, and so forth.

At block 810, the processor is selectively implementing a protective measure based on the comparing. For example, the integrity controller 502 can selectively implement a protective measure based on the comparing operation (e.g., based on a comparison 516). Thus, if the codes match, the integrity controller 502 can authorize an operation 506 to proceed using a control signal 518, can process a result value 510 for further use in code execution, can decline to interrupt operational processing, and so forth. If, on the other hand, the codes do not match, the integrity controller 502 can interrupt operational processing by blocking usage of the register value 408 or the result value 510, by correcting the register value 408 using the integrity code 114, by re-executing at least a portion of code that uses the register value 408, by resetting at least the processor 500 of an integrated circuit, and so forth.

In some implementations, the integrity controller 502 can also process newly determined results of operations to protect the register file 112. For example, the integrity controller 502 can generate another integrity code 114 based on a result (e.g., a result value 510) of an operation 506. The integrity controller 502 can also store the result as another register value 408 in another register block 404 (e.g., of FIG. 4) of the processor 500. The integrity controller 502 can further store the other integrity code 114 in another integrity block 406 of the processor 500, with the other integrity block 406 being associated with the other register block 404.

Aspects of these methods may be implemented in, for example, hardware (e.g., fixed logic circuitry or a processor in conjunction with a memory), firmware, software, or some combination thereof. The methods may be realized using one or more of the apparatuses or components shown in FIGS. 1 to 7 and 9, which components may be further divided, combined, and so on. The devices and components of these figures generally represent hardware, such as electronic devices, PCBs, packaged modules, IC chips, components, or circuits; firmware; software; or a combination thereof. Thus, these figures illustrate some of the many possible systems or apparatuses capable of implementing the described methods.

For the methods described herein and the associated flow diagram(s), the orders in which operations are shown and/or described are not intended to be construed as a limitation. Instead, any number or combination of the described method operations can be combined in any order to implement a given method or an alternative method. Operations may also be omitted from or added to the described methods. Further, described operations can be implemented in fully or partially overlapping manners.

Example Electronic Devices for Register File Protection

Figure 9:
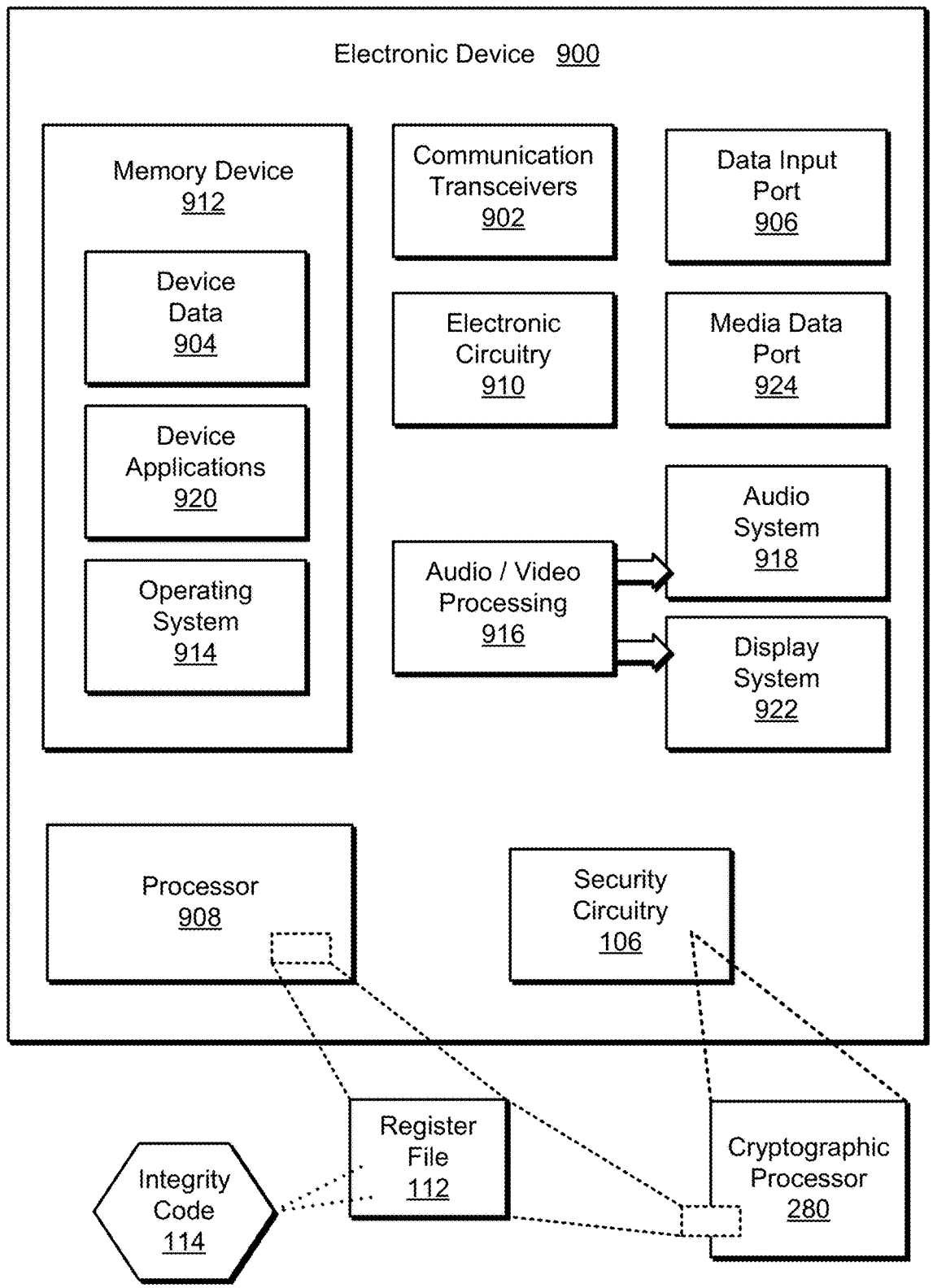
FIG. 9 illustrates various components of an example electronic device that can implement register file protection in accordance with one or more described aspects.

FIG. 9 illustrates various components of an example electronic device 900 that can implement register file protection in accordance with one or more described aspects. The electronic device 900 may be implemented as any one or combination of a fixed, mobile, stand-alone, or embedded device; in any form of a consumer, computer, portable, user, server, communication, phone, navigation, gaming, audio, camera, messaging, media playback, and/or other type of electronic device 900, such as the smartphone that is depicted in FIG. 1 as the apparatus 102. One or more of the illustrated components may be realized as discrete components or as integrated components on at least one integrated circuit of the electronic device 900.

The electronic device 900 can include one or more communication transceivers 902 that enable wired and/or wireless communication of device data 904, such as received data, transmitted data, or other information identified above. Example communication transceivers 902 include near-field communication (NFC) transceivers, wireless personal area network (PAN) (WPAN) radios compliant with various IEEE 802.15 (Bluetooth®) standards, wireless local area network (LAN) (WLAN) radios compliant with any of the various IEEE 802.11 (Wi-Fi®) standards, wireless wide area network (WAN) (WWAN) radios (e.g., those that are 3GPP-compliant) for cellular telephony, wireless metropolitan area network (MAN) (WMAN) radios compliant with various IEEE 802.16 (WiMAX®) standards, infrared (IR) transceivers compliant with an Infrared Data Association (IrDA) protocol, and wired local area network (LAN) (WLAN) Ethernet transceivers.

The electronic device 900 may also include one or more data input ports 906 via which any type of data, media content, and/or other inputs can be received, such as user-selectable inputs, messages, applications, music, television content, recorded video content, and any other type of audio, video, and/or image data received from any content and/or data source, including a sensor like a microphone or a camera. The data input ports 906 may include USB ports, coaxial cable ports, fiber optic ports for optical fiber interconnects or cabling, and other serial or parallel connectors (including internal connectors) for flash memory, DVDs, CDs, and the like. These data input ports 906 may be used to couple the electronic device to components, peripherals, or accessories such as keyboards, microphones, cameras, or other sensors.

The electronic device 900 of this example includes at least one processor 908 (e.g., any one or more of application processors, microprocessors, digital-signal processors (DSPs), controllers, and the like), which can include a combined processor and memory system (e.g., implemented as part of an SoC), that processes (e.g., executes) computer-executable instructions to control operation of the device. The processor 908 may be implemented as an application processor, embedded controller, microcontroller, security processor, artificial intelligence (AI) accelerator, and the like. Generally, a processor or processing system may be implemented at least partially in hardware, which can include components of an integrated circuit or on-chip system, a digital-signal processor (DSP), an application-specific integrated circuit (ASIC), a field-programmable gate array (FPGA), a complex programmable logic device (CPLD), and other implementations in silicon and/or other materials.

Alternatively or additionally, the electronic device 900 can be implemented with any one or combination of electronic circuitry, which may include software, hardware, firmware, or fixed logic circuitry that is implemented in connection with processing and control circuits, which are generally indicated at 910 (as electronic circuitry 910). This electronic circuitry 910 can implement executable or hardware-based modules (not shown in FIG. 9), such as through processing/computer-executable instructions stored on computer-readable media, through logic circuitry and/or hardware (e.g., such as an FPGA), and so forth.

Although not shown, the electronic device 900 can include a system bus, interconnect, crossbar, data transfer system, or other switch fabric that couples the various components within the device. A system bus or interconnect can include any one or a combination of different bus structures, such as a memory bus or memory controller, a peripheral bus, a universal serial bus, and/or a processor or local bus that utilizes any of a variety of bus architectures.

The electronic device 900 also includes one or more memory devices 912 that enable data storage, examples of which include random access memory (RAM), non-volatile memory (e.g., read-only memory (ROM), flash memory, EPROM, and EEPROM), and a disk storage device. Thus, the memory device(s) 912 can be distributed across different logical storage levels of a system as well as at different physical components. The memory device(s) 912 provide data storage mechanisms to store the device data 904, other types of code and/or data, and various device applications 920 (e.g., software applications or programs). For example, an operating system 914 can be maintained as software instructions within the memory device 912 and executed by the processor 908.

In some implementations, the electronic device 900 also includes an audio and/or video processing system 916 that processes audio data and/or passes through the audio and video data to an audio system 918 and/or to a display system 922 (e.g., a video buffer or a screen of a smartphone or camera). The audio system 918 and/or the display system 922 may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, video bus, or other similar communication link, such as a media data port 924. In some implementations, the audio system 918 and/or the display system 922 are external or separate components of the electronic device 900. Alternatively, the display system 922, for example, can be an integrated component of the example electronic device 900, such as part of an integrated touch interface.

The electronic device 900 of FIG. 9 is an example implementation of the apparatus 102 of FIG. 1, an example implementation of a device that can include a register file 112 of FIG. 4, and an example implementation of a device that can implement any of the methods of FIG. 8. The electronic device 900 can thus include security circuitry 106, which can be a separate IC chip or included as part of another IC chip or device, like the processor 908, the electronic circuitry 910, or the memory device 912. Accordingly, one or more of the illustrated components may be integrated on the same IC chip, like an SoC, or at least on a single PCB. The electronic device 900 may additionally or alternatively include a cryptographic processor 280 (as shown) or a processor 202, 500, or 600 (of FIGS. 2/3, 5, and 6, respectively). Any one or more of such example processors (also including the depicted processor 908) can have a register file 112 that includes or is associated with at least one integrity code 114. The principles of register file protection as described herein can therefore be implemented by, or in conjunction with, the electronic device 900 of FIG. 9.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description. Although implementations for a register file protection have been described in language specific to certain features and/or methods, the subject of the appended claims is not necessarily limited to the specific features or methods described. Rather, the specific features and methods are disclosed as example implementations for register file protection.

What is claimed is:

1. An integrated circuit comprising:
a processor, the processor including:
multiple register blocks configured to store multiple register values;
multiple integrity blocks configured to store multiple integrity codes, a respective integrity block of the multiple integrity blocks associated with a respective register block of the multiple register blocks, the respective integrity block configured to store a respective integrity code derived from a respective register value stored in the respective register block; and
an integrity controller coupled to the multiple register blocks and the multiple integrity blocks, the integrity controller configured to:
obtain a computed integrity code based on the respective register value retrieved from the respective register block for an arithmetic operation;
perform a comparison including the computed integrity code and the respective integrity code retrieved from the respective integrity block; and
selectively implement a protective measure based on the comparison.

2. The integrated circuit of claim 1, wherein:
the processor includes an execution unit coupled to the multiple register blocks; and
the execution unit is configured to access the multiple register values of the multiple register blocks.

3. The integrated circuit of claim 2, wherein the execution unit comprises at least one of:
an arithmetic logic unit (ALU); or
a multiply-accumulate unit.

4. The integrated circuit of claim 2, wherein the execution unit is configured to:
access two or more register blocks of the multiple register blocks using two or more register addresses during a single operational cycle to obtain two or more operands for an operation.

5. The integrated circuit of claim 1, wherein:
the multiple register blocks include a register block configured to store a data value comprising multiple bits; and
the register block comprises multiple flip-flops, each flip-flop of the multiple flip-flops configured to store a bit of the multiple bits.

6. The integrated circuit of claim 1, wherein the processor includes:
an interface coupled to the multiple register blocks and the multiple integrity blocks, the interface comprising:
a first portion configured to buffer the respective register value of the respective register block; and
a second portion configured to buffer the respective integrity code of the respective integrity block.

7. The integrated circuit of claim 6, further comprising:
an interconnect coupled to the processor via the interface, the interconnect comprising:
a first portion configured to propagate the respective register value of the respective register block; and
a second portion configured to propagate the respective integrity code of the respective integrity block.

8. The integrated circuit of claim 6, wherein the integrity controller is configured to:
control transport of the respective register value between the interface and the respective register block based on the comparison.

9. The integrated circuit of claim 1, wherein:
the multiple integrity blocks are co-located with the multiple register blocks; and
the respective integrity block is configured to be accessed responsive to an access of the respective register block.

10. The integrated circuit of claim 1, wherein the integrity controller is configured to:
monitor the multiple register values based on the multiple integrity codes effective to prevent use of a register value of the multiple register values, the register value having become corrupted between two successive operations.

11. The integrated circuit of claim 1, wherein:
the multiple integrity codes comprise multiple error correction codes; and
the respective integrity code of the multiple integrity codes comprises a respective error correction code of the multiple error correction codes.

12. The integrated circuit of claim 1, wherein the protective measure comprises at least one of:
blocking usage of the respective register value;
blocking usage of a result value produced using the respective register value;
correcting the respective register value of the respective register block using the respective integrity code;
re-executing at least a portion of code that uses the respective register value; or
resetting at least the processor of the integrated circuit.

13. A method for protecting a register file, the method comprising:
retrieving a register value from a register block of a processor;
retrieving an integrity code from an integrity block of the processor, the integrity block associated with the register block, the integrity code derived from the register value;
obtaining, prior to performance of an operation that uses the register value, a computed integrity code based on the register value retrieved from the register block;
comparing the computed integrity code and the integrity code retrieved from the integrity block; and
selectively implementing a protective measure based on the comparing.

14. The method of claim 13, wherein the selectively implementing comprises, responsive to the computed integrity code matching the integrity code retrieved from the integrity block, at least one of:
providing an authorization control signal to an execution unit; or
permitting operational processing to continue without interruption.

15. The method of claim 13, wherein the selectively implementing comprises, responsive to the computed integrity code failing to match the integrity code retrieved from the integrity block, at least one of:
   blocking usage of the register value;
   blocking usage of a result value produced using the register value;
   correcting the register value of the register block using the integrity code;
   re-executing at least a portion of code that uses the register value; or
   resetting at least part of an integrated circuit.

16. The method of claim 13, wherein the obtaining and the comparing are performed responsive to an access of the register block to retrieve the register value to perform the operation that uses the register value.

17. The method of claim 13, further comprising:
   obtaining another integrity code based on a result of the operation;
   storing the result as another register value in another register block of the processor; and
   storing the other integrity code in another integrity block of the processor, the other integrity block associated with the other register block.

18. The method of claim 13, further comprising:
   receiving, from an interconnect, another register value and another integrity code at an interface of the processor;
   storing the other register value in another register block of the processor; and
   storing the other integrity code in another integrity block of the processor, the other integrity block associated with the other register block.

19. An integrated circuit comprising:
   an execution unit;
   a cache memory; and
   a register file coupled between the execution unit and the cache memory, the register file including a register entry comprising:
      a register block configured to store a register value; and
      an integrity block associated with the register block, the integrity block configured to store an integrity code derived from the register value prior to performance of an operation that includes the register value and at least one other register value,
   the integrated circuit configured to:
      obtain a computed integrity code based on the register value retrieved from the register block;
      compare the computed integrity code and the integrity code as retrieved from the integrity block; and
      selectively implement a protective measure based on the comparison.

20. The integrated circuit of claim 19, wherein:
   the register file is configured to store working values for the execution unit; and
   the register value comprises at least one of:
      a data value;
      an instruction value; or
      an address value.

\* \* \* \* \*